(12) United States Patent
Borden et al.

(10) Patent No.: US 9,393,602 B2
(45) Date of Patent: Jul. 19, 2016

(54) IN SITU PH ADJUSTMENT FOR SOIL AND GROUNDWATER REMEDIATION

(75) Inventors: Robert C. Borden, Raleigh, NC (US); Jason M. Tillotson, Raleigh, NC (US); Mark Tony Lieberman, Raleigh, NC (US)

(73) Assignee: Solutions-IES Inc., Raleigh, NC (US)

( * ) Notice: Subject to any disclaimer, the term of this patent is extended or adjusted under 35 U.S.C. 154(b) by 565 days.

(21) Appl. No.: 13/037,336

(22) Filed: Feb. 28, 2011

(65) Prior Publication Data

US 2011/0139695 A1    Jun. 16, 2011

Related U.S. Application Data

(63) Continuation-in-part of application No. 11/800,266, filed on May 4, 2007, now abandoned.

(51) Int. Cl.
| | |
|---|---|
| *B09C 1/08* | (2006.01) |
| *B09C 1/10* | (2006.01) |
| *B09C 1/00* | (2006.01) |
| *C09K 3/32* | (2006.01) |

(52) U.S. Cl.
CPC . *B09C 1/002* (2013.01); *B09C 1/08* (2013.01); *B09C 1/10* (2013.01); *B09C 2101/00* (2013.01)

(58) Field of Classification Search
CPC ............ B09C 1/002; B09C 1/10; B09C 1/08; B09C 2101/00
USPC ......... 405/263, 128.1, 128.7, 128.75; 516/22, 516/28, 29, 33; 435/265, 281, 282
See application file for complete search history.

(56) References Cited

U.S. PATENT DOCUMENTS

| | | | | |
|---|---|---|---|---|
| 3,951,849 | A * | 4/1976 | Vickery et al. | 516/33 |
| 3,981,965 | A * | 9/1976 | Gancy et al. | 588/319 |
| 4,084,381 | A * | 4/1978 | Cain et al. | 405/266 |
| 5,202,033 | A * | 4/1993 | Stanforth et al. | 405/128.5 |
| 5,728,302 | A * | 3/1998 | Connor et al. | 210/679 |
| 5,759,939 | A * | 6/1998 | Klabunde et al. | 502/328 |
| 5,762,901 | A * | 6/1998 | Richmond et al. | 423/635 |
| 5,846,434 | A * | 12/1998 | Seaman et al. | 210/724 |
| 5,857,810 | A * | 1/1999 | Cantrell et al. | 405/263 |
| 6,268,205 | B1 * | 7/2001 | Kiest et al. | 210/631 |
| 6,315,494 | B1 * | 11/2001 | Oberle | 405/128.5 |
| 6,398,960 | B1 * | 6/2002 | Borden et al. | 210/610 |
| 6,447,577 | B1 * | 9/2002 | Espin et al. | 95/136 |
| 7,160,471 | B2 * | 1/2007 | Looney et al. | 210/747.8 |
| 2004/0094300 | A1 * | 5/2004 | Sullivan et al. | 166/308.1 |
| 2005/0061504 | A1 * | 3/2005 | Frost et al. | 166/279 |
| 2005/0252658 | A1 * | 11/2005 | Willingham et al. | 166/279 |
| 2006/0122071 | A1 * | 6/2006 | Reddy et al. | 507/219 |
| 2006/0211775 | A1 * | 9/2006 | Crews | 516/109 |
| 2007/0297858 | A1 * | 12/2007 | Imbrie | 405/128.45 |
| 2008/0273925 | A1 * | 11/2008 | Borden et al. | 405/128.5 |
| 2011/0139695 | A1 * | 6/2011 | Borden | 210/170.07 |

FOREIGN PATENT DOCUMENTS

WO    WO 2005/081996 A2 *    9/2005

* cited by examiner

*Primary Examiner* — Daniel S Metzmaier
(74) *Attorney, Agent, or Firm* — Olive & Olive, P.A.

(57) ABSTRACT

The present invention provides a safe, low-cost, effective composition and method for the remediation of contaminated subsurface material, the composition comprising solid alkaline material preferably in combination with stabilizing agents, that can be used to increase or maintain the pH of a subsurface zone and improve the performance of in situ treatment processes.

2 Claims, 4 Drawing Sheets

IN SITU PH ADJUSTMENT FOR SOIL AND GROUNDWATER REMEDIATION

CROSS-REFERENCE TO RELATED APPLICATIONS

The present application is a continuation in part of U.S. patent application Ser. No. 11/800,266 entitled "IN SITU pH ADJUSTMENT FOR SOIL AND GROUNDWATER REMEDIATION," filed on May 4, 2007, now abandoned, the entire disclosure of which is incorporated herein by reference.

BACKGROUND OF THE INVENTION

1. Field of the Invention

This invention relates to the remediation of contaminated subsurface material, utilizing a composition of alkaline solids for adjusting and maintaining the pH of subsurface material to a value which enhances remediation.

2. Description of the Related Art

There are numerous techniques employed for the remediation of contaminated subsurface material. The mechanisms for cleanup may be physical, chemical or biological. Common physical remediation methods include excavation and disposal of contaminated soil, and pumping and treatment of contaminated groundwater.

In situ treatment of contaminated subsurface material is often a less expensive approach because it eliminates the need for physical removal of the contaminated material. Common in situ treatment approaches include aerobic and anaerobic bioremediation, chemical oxidation and reduction, soil vapor extraction, air sparging, and in situ stabilization-immobilization. Most, if not all, in situ treatment processes have an optimum pH for the treatment process. Many bioremediation processes require a pH of between 6 and 8 Standard Units (SU) for optimum growth of the required microorganisms and contaminant biodegradation. Chemical oxidation, reduction and immobilization processes will also have an optimum pH. If the pH is too low, reaction rates may be reduced or the solubility of the target chemical may be too high or too low. Different remediation techniques that have been employed for various contaminants are discussed more specifically below.

It is noted that in discussing related art herein, it is often referred to in somewhat cryptic notation. For purposes of clarity, reference is made to a bibliographic section set forth at the end of this BACKGROUND OF THE INVENTION where full citations of references discussed and other references of interest are identified in their entirety. The inclusion of a reference in the bibliographic section and/or in any discussion of related art is not intended to suggest that all such references do or could constitute prior art with respect to the present invention, as certain references are included and/or discussed simply to provide a broader appreciation of the art.

The optimum pH for microbial growth is dependent on the specific microorganisms and their respiration pathways. Aerobic microorganisms often tolerate a wider range in pH, whereas many anaerobes are sensitive to pH and operate efficiently only in a narrow pH range. Denitrification and methanogenic biodegradation rates are usually optimum between a pH of 7 and 8 SU, and may drop off rapidly below a pH of 6 SU (van den Berg, 1974; US EPA, 1975). The pH of most water supply aquifers is between 6.0 and 8.5 SU, although water having lower pH is not uncommon (Hem, 1999).

While microbial populations can endure a wide range of pH, a pH close to neutral (6 to 8 SU) is the most conducive to the growth and proliferation of healthy and diverse microbial populations necessary for anaerobic dechlorination. Low pH conditions (<5 SU) are detrimental to sulfate-reducing, methanogenic, and dechlorinating bacteria. *Dehalococcoides ethenogenes* are the only known organisms that can completely dechlorinate perchloroethene (PCE) and trichloroethene to the non-toxic endproduct ethene. However, *Dehalococcoides E.* appear to be very pH sensitive. Young and Gossett (1997) found that dechlorination of PCE was four-fold slower at pH 6 than at pH 7 SU in a series of experiments with an enrichment culture known to contain *Dehalococcoides*.

A variety of heavy metals can be immobilized in situ by increasing the aquifer pH. Barium (Ba), cadmium (Cd), chromium (Cr), lead (Pb), and mercury (Hg) have a reduced solubility under alkaline conditions (Dragun, 1988) so these metals can be precipitated in situ by adjusting the pH. Other contaminants including arsenic can be treated by enhancing iron (Fe) or manganese (Mn) precipitation through pH adjustment. In addition, heavy metal removal can be enhanced by adjusting the pH to enhance sorption to mineral surfaces including iron, manganese, alumina, silica oxides and their respective hydrous, anhydrous hydroxy, and oxyhydroxy forms (Bethke, U.S. Pat. No. 7,141,173, November 2006).

Heavy metals can be further reduced using a combination of pH and redox adjustment. Deutsch et al. (2002) describe the enhanced removal of Fe and As induced by addition of an oxidizing agent and alkaline material. Miller et al. (2006) demonstrated that addition of dissolved NaOH could be used to increase the pH of acidic groundwater (pH 3 to 4 SU), reducing levels of dissolved cadmium, copper (Cu), lead, manganese, nickel (Ni), and zinc (Zn). However, use of calcium polysulfide (CPS) in combination with sodium hydroxide (NaOH) was most effective in treating severe conditions.

Chemical oxidation processes can be used to treat subsurface material and groundwater contaminated with organic and inorganic pollutants. Many of these processes have an optimum pH for destruction or immobilization of the pollutants. For example, chemical oxidation in combination with pH adjustment can be used to precipitate iron, manganese and arsenic (Hem, 1999). Persulfate in combination with high pH can be used to chemically oxidize a variety of subsurface contaminants including chlorinated ethenes, ethanes, and methanes, mono- and polynuclear aromatic hydrocarbons, oxygenates, petroleum hydrocarbons, chlorobenzenes, phenols, pesticides, herbicides, ketones and polychlorinated biphenyls (FMC Environmental Solutions, Klozur Activation Chemistries, 2006; Block et al., 2006, US Patent Application 20060054570, ITRC, 2006; Brown et al., 2006; White et al. 2006; Crimi and Taylor, 2006). However, pH levels greater than 10.5 SU are required activate persulfate enhancing oxidative degradation of many target compounds (ITRC 2006; Crimi and Taylor, 2007). Achieving these high pH levels can be difficult due to the strong buffering capacity of many subsurface materials. Block et al. (2005) describe a process for oxidizing organic compounds where the organic compound is contacted with a composition of a water soluble peroxygen and a water soluble pH modifier (e.g. sodium and potassium hydroxide), which maintains the pH of the composition at greater than about 10 SU). However, a solid alkaline material such as CaO or $Ca(OH)_2$ could also be used to increase the pH to greater than 10 SU.

Chemical reduction processes can also be used to treat subsurface material and groundwater contaminated with organic and inorganic pollutants. For example, Boparai et al. (2006) showed that aquifer sediment and surface soils contaminated with herbicides can be treated with dithionite when the pH is increased to 8.5 SU. However, at the ambient pH of 6.9 SU, there was no transformation of the pollutant. Similar results were reported by Lee and Batchelor (2002) who reported an increase in the TCE dechlorination rate when the pH was increased from 6.8 to 8.1. A pH of 8.1 to 8.5 SU could be achieved by injection of a suspension of $Mg(OH)_2$.

There are a variety of different conditions that can lead to low pH conditions which can inhibit treatment processes. In the Southeastern United States, many soils and the underlying aquifers have a naturally low pH. Under anaerobic conditions, a variety of organic materials can be fermented, releasing short-chain fatty acids (butyric, propionic and acetic acids) that can further reduce pH. Frizzell et al. (2004) found that injecting a mixture of high-fructose corn syrup and cheese whey stimulated biological activity resulting in a drop in pH to below 4.0 SU.

Currently, there are two generally accepted available methods for increasing aquifer pH. The first and most common method is to circulate a solution containing a dissolved base or alkaline material through the treatment zone. Materials commonly used include aqueous solutions of NaOH, potassium hydroxide (KOH), sodium carbonate ($Na_2CO_3$), sodium bicarbonate ($NaHCO_3$), and sodium metasilicate ($Na_2SiO_3$). Arcadis (2002) and Lutes et al. (2006) describe methods for circulating buffer solutions containing carbonates, bicarbonates, or phosphates to control pH declines. Cline et al. (2005) describes injection of KOH solutions to increase the aquifer pH from 4.5 to as high as 6.6 SU to enhance reductive dechlorination of PCE at a dry cleaning store.

While circulating alkaline solutions through the treatment zone can be effective, there are some major disadvantages to this approach. As the alkaline solution migrates through the formation, the alkalinity present in the water reacts with the acidic mineral surfaces and is consumed. Consequently, a large amount of alkaline material must be added to increase the pH. This can be accomplished by injecting multiple pore volumes of dilute base or smaller amounts of very concentrated base. Injecting multiple pore volumes is difficult to implement and increases costs. Injecting very concentrated base will increase the pH to unacceptable levels and can expose site workers to safety hazards.

A second approach for increasing the pH of the formation is to inject a solid alkaline material. These materials can be injected by boring a hole in the subsurface followed by gravity or pressure injection of a slurry. Solid alkaline materials that can be used in this approach include magnesium oxide (MgO), magnesium hydroxide ($Mg(OH)_2$), magnesium carbonate ($MgCO_3$), calcium oxide (CaO), calcium hydroxide ($Ca(OH)_2$), and calcium carbonate ($CaCO_3$). Deutsch et al. (2002) describe the injection of a slurry of MgO and $Mg(OH)_2$ to increase the pH and redox potential to precipitate iron and arsenic. While this approach has the advantage over aqueous injection in that large amounts of material can be quickly injected, the beneficial increase in pH is often limited to the immediate area around the injection point. To increase the pH throughout the treatment zone, the solid alkaline material (also referred to as "alkaline solids") can be physically mixed with the sediment or transported through the pore spaces away from the injection point. Large augers or mixers can be used for physical mixing, which typically is very expensive and disruptive.

Stanforth et al. (U.S. Pat. No. 5,202,033) teach a method of immobilizing heavy metals in soil or solid waste by mixing with a phosphate, carbonate, or ferrous sulfate stabilizing agent and alkaline material including MgO, $Mg(OH)_2$, CaO and $Ca(OH)_2$. The stabilizing agent and alkaline material may be physically mixed with the soil at the surface or injected as a solution or slurry using injection wells or an injection nozzle. Stanforth teaches a variety of methods for physically mixing the material with the sediment including tilling and in-place mechanical mixing with a hollow-stem auger. Stanforth does not make any mention of methods to transport solid alkaline materials through the aquifer pore spaces or that this transport mechanism would be possible.

There are several major challenges associated with transporting alkaline solids through the aquifer pore spaces including particle removal by settling, capture of positively charged alkaline solid particles by negatively charged soil surfaces, and particle-particle collisions which lead to formation of dendrites that reduce transport and eventually lead to pore clogging.

Transport of solid alkaline particles is reduced by settling of the particles in the aquifer pore spaces. Removal of solid particles by settling is proportional to the particle specific gravity, aqueous phase viscosity, settling distance, and particle diameter (Fair et al., 1968). All useful alkaline solids of which the inventor presently is aware have a specific gravity greater than 2 which can result in rapid settling. In the subsurface, particle removal efficiency will be very high in due to the very small distance a particle must settle in an aquifer pore. Particle capture by settling can be reduced by adding thickening agents to the injection fluid to increase viscosity. However, the increase in fluid viscosity makes injection more difficult (Cantrell et al., 1997). Particle removal by settling can be reduced by using very small particles. However as particle diameter decreases, Brownian motion increases particle-aquifer collisions increasing removal (Tratnyek and Johnson 2006). As a result, there will be an optimum particle diameter where both settling and particle collisions due to Brownian motion are minimized.

Borden and Lee (U.S. Pat. No. 6,398,960B1) teach a method for remediating contaminated aquifers with an oil emulsion with an average droplet size less than the median pore size of the sediment to reduce straining capture in the aquifer pores. Coulibaly and Borden (2004) present pore size distributions for a variety of sediments where the median pore size varies from 35 to over 100 microns, indicating the average droplet size of the emulsion would need to be less than 30 microns. Borden et al. (U.S. Pat. No. 6,398,960) do not make any mention of settling as an important control on emulsion transport in the subsurface since oil droplets are slightly less dense than water and settling has no significant impact on emulsion transport.

The point of zero charge for useful alkaline solids (including MgO, $Mg(OH)_2$, $MgCO_3$, CaO, $Ca(OH)_2$, and $CaCO_3$) varies between 8 and 12 (Pechenyuk 1999, Parks 1965, Pokrovsky et al. 1999), so these solids will have a positive surface charge under ambient conditions. Under these same conditions, most aquifer surfaces have a net negative charge. As a result, alkaline solids are strongly retained. Seaman et al. (U.S. Pat. No. 5,846,434) teach a method of mobilizing colloidal metal oxides from a contaminated aquifer by flushing a solution containing a cationic surfactant, preferably a quaternary alkylammonium surfactant, through the aquifer. The cationic surfactants adsorb to the surface of negatively charged phyllosilicate clays, generating a positively charged surface, reducing capture of the metal hydroxides. Seaman et al does not make any mention of altering the surface charge of the mobile particles or controlling the settling rate in the subsurface to improve particle mobility. However, Seaman et al. does describe the addition of alkaline material to extracted water to cause the colloidal metal oxides to settle out of the extracted groundwater. Seaman's addition of alkaline material to enhance settling illustrates the challenges of distributing solid alkaline material in the subsurface since these materials will rapidly settle out in the aquifer pore spaces and will not be transported any significant distance.

Particle-particle collisions often lead to formation of dendrites that reduce transport and result in pore clogging (Soo and Radke 1985, Rege and Fogler 1988, and Sahimi and Imdakm 1991). A variety of different investigators have attempted to improve transport of nano and micron sized particles using a variety of different coatings and stabilizing agents to reduce particle-particle collisions and dendrite formation (He et al. 2005, Hydutsky et al. 2007, Quinn et al. 2005, Saleh et al. 2007, Schrick et al. 2004). However none of these methods have been satisfactory. Gavaskar, et al. summarize the results of a series of field tests where effective distribution of nano-particles was not successful.

With reference to the foregoing discussion, reference is made to the following references, the disclosures of which are specifically incorporated by reference herein.

| U.S. Pat. Documents | | |
|---|---|---|
| 3,692,898 | September 1972 | Gorman et al. |
| 4,340,253 | July 1982 | Breland |
| 4,401,569 | August 1983 | Jhaveri et al. |
| 4,418,961 | December 1983 | Strom |
| 5,008,019 | April 1991 | Trost |
| 5,202,033 | April 1993 | Stanforth et al |
| 5,265,674 | November 1993 | Frederickson et al. |
| 5,277,815 | January 1994 | Beeman |
| 5,324,433 | June 1994 | Grant |
| 5,487,879 | January 1996 | Witkowski et al. |
| 5,514,357 | May 1996 | Richmond et al. |
| 5,554,290 | September 1996 | Suthersan |
| 5,264,018 | December 1997 | Koenigsberg et al. |
| 5,725,470 | March 1998 | Lazarowitz et al. |
| 5,762,901 | June 1998 | Richmond et al. |
| 5,840,571 | November 1998 | Beeman et al. |
| 5,846,179 | December 1998 | Price |
| 5,846,434 | December 1998 | Seaman et al. |
| 5,989,517 | November 1999 | Richmond |
| 5,993,660 | November 1999 | Shook et al. |
| 6,059,973 | May 2000 | Hudson et al. |
| 6,110,372 | August 2000 | Perriello |
| 6,143,195 | November 2000 | Price |
| 6,267,888 | July 2001 | Satyanarayana |
| 6,398,960 | June 2002 | Borden et al. |
| 20040245185 | December 2004 | Chowdhury |
| 7,160,471 | January 2007 | Looney et al. |
| 20060054570 | March 2006 | Block et al. |
| 7,141,173 | November 2006 | Bethke |
| International patents | | |
| WO 1993/9301136 [PCT/Al 19930121] | 2003 | Bircher et al. |
| WO 2005/081996 [PCTIUS2005/005 852] | February 2004 | Block |

OTHER PUBLICATIONS

AFCEE, 2004. Principles and Practices of Enhanced Anaerobic Bioremediation of Chlorinated Solvents, Air Force Center for Environmental Excellence/Naval Facilities Engineering Service Center/Environmental Security Technology Certification Program, Brooks City-Base, Tex., August 2004.

Arcadis, 2002. Technical Protocol for Using Carbohydrates to Enhance Reductive Dechlorination of Chlorinated Aliphatic Hydrocarbons. Report prepared for ESTCP (Contract # F41624-99-C-8032).

Block, P. A., R. A. Brown and D. Robinson, 2004. Novel activation technologies for sodium persulfate in situ oxidation. In: Gavaskar, A. R. and A. S. C. Chen (eds.), Remediation of Chlorinated and Recalcitrant Compounds-2004. Proceedings of the Fourth International Conference on Remediation of Chlorinated and Recalcitrant Compounds (Monterey, Calif.; May 2004). ISBN 1-57477-145-0, Battelle Press, Columbus. OH.

Boparai H. K., P. J. Shea, S. D. Comfort and D. D. Snow, 2006. Dechlorinating chloroacetanilide herbicides by dithionite-treated aquifer sediment and surface soil. Environmental Science and Technology, 40, 3043-3049.

Borden, R. C., Natural Bioremediation of Hydrocarbon-Contaminated Groundwater. In: Norris, Hinchee, Brown, McCarty, Semprini, Wilson, Kampbell, Reinhard, Bouwer, Borden, Vogel, Thomas and Ward (eds.), Handbook of Bioremediation. ISBN 1-56670-074-4, 1994, CRC Press, Boca Raton, Fla.

Brown, R. A., P. Block, R. J. Watts and A. L. Teel, 2006. Presentation abstract: Contaminant-specific persulfate activation. The Fifth International Conference on Remediation of Chlorinated and Recalcitrant Compounds (Monterey, Calif., May 22-25). Battelle 2006.

Cantrell, K. J., D. I. Kaplan, and T. J. Gilmore. 1997. Injection of colloidal Fe0 particles in sand with shear-thinning fluids. Journal of Environmental Engineering 123, no. 8: 786-791.

Cline, D. M., P. J. W. Jackson and M. Collins III. 2005. KOH Injections in low-pH aquifers to enhance anaerobic degradation. In: Allerman, B. C. and M. E. Kelly (Conf. Chairs). Proceedings of the Eight International In Situ and On-Site Bioremediation Symposium (Baltimore, Md., Jun. 6-9, 2005). ISBN 1-57477-152-3, Battelle Press, Columbus, Ohio.

Coulibaly, K. M. and Borden, R. C. 2004. Impact of edible oil injection on the permeability of aquifer sands. Journal of Contaminant Hydrology 71: 219-237.

Crimi, M. L. and J. Taylor, 2007. Experimental evaluation of catalyzed hydrogen peroxide and sodium persulfate for destruction of BTEX contaminants. Soil and Sediment Contamination, 16: 29-45.

Deutsch, W. J., M. Dooley, S. Koenigsburg, B. Butler and G. Dobbs, 2002. In situ redox manipulation for arsenic remediation. In: Proceedings of the Third International Conference on Remediation of Chlorinated and Recalcitrant Compounds (Monterey, Calif. May 20-23, 2002.) ISBN 1-57477-132-9, Battelle Press, Columbus, Ohio.

Dragun, J. 1988. The Soil Chemistry of Hazardous Materials. Hazardous Materials Control Research Institute, Silver Springs, Md.

Duffy, B. E., G. Oudijk and J. H. Guy, 1999. Enhanced aerobic bioremediation of petroleum UST releases in Puerto Rico. In: Koenigsberg, S S. and R. D. Norris (eds.). Accelerated Bioremediation Using Slow Release Compounds, Selected Battelle Conference Papers: 1993-1999. Regenesis Bioremediation Products, 1999, pp 181-186.

Fair, G. M., J. C. Geyer, D. A. Okun, 1968. Water and Wastewater Engineering, John Wiley & Sons, NY.

FMC Environmental Solutions, 2005. Klozur™ Activated Persulfate. Published at the following Internet site: envsolutions.fmc.com/Klozur8482/tabid/355/default.aspx.

Freeman, H. M., (Ed), 1988. Standard Handbook of Hazardous Waste Treatment and Disposal. ISBN 0-07-022042-5. McGraw-Hill Book Company, NY, N.Y., Page 9.21.

Frizzell, A., C. C. Lutes, H. Voscott and M. Hansen. 2004. Enhanced reductive dechlorination of a PCE plume using corn syrup and cheese whey. In: Principles and Practices of Enhanced Anaerobic Bioremediation of Chlorinated Solvents, Appendix E. AFCEE/NFESC/ESTCP, Brooks City-Base, Tex. August 2004.

Gavaskar, A., L. Tatar, and W. Condit, 2005. Final Cost and Performance Report—Nanoscale Zero-Valent Iron Technologies for Source Remediation.

He, F., and D. Zhao, 2005. Preparation and characterization of a new class of starch-stabilized bimetallic nanoparticles for degradation of chlorinated hydrocarbons in water, Environmental Science and Technology. 39, 3314-3320, 2005.

Hydutsky, B, E. J. Mack, B. B. Beckerman, J. M Skluzacek and T. E. Mallouk, 2007. Optimization of nano- and micro-iron transport through sand columns using polyelectrolyte mixtures, Environmental Science and Technology, 41, 6418-6424.

Hem, J. D., 1985. Study and interpretation of the chemical characteristics of natural waters, USGS Water Supply Paper 2254, 1985.

Interstate Technology & Regulatory Council, 2005. Technical and Regulatory Guidance for In Situ Chemical Oxidation of Contaminated Soil and Groundwater, 2nd Ed.

Koenigsberg, S. S, and R. D. Norris (eds.), 1999. Accelerated Bioremediation Using Slow Release Compounds, Selected Battelle Conference Papers: 1993-1999. Regenesis Bioremediation Products, 1999.

Lee, W. and B. Batchelor, 2002. Abiotic reductive dechlorination of chlorinated ethylenes by iron-bearing soil minerals. Environmental Science and Technology, 36, 5348-5354.

Lutes, C. C., A. Frizzell, and S. S. Suthersan, 2006. Enhanced reductive dechlorination of CAHs using soluble carbohydrates—A summary of detailed data from 50 Sites. In: Principles and Practices of Enhanced Anaerobic Bioremediation of Chlorinated Solvents, Appendix E. AFCEE/NFESC/ESTCP, Brooks City-Base, Tex. August 2004.

Miller, G., M. Hayter and P. Storch. 2006. Abstract: In situ treatment of acidic, metal-impacted groundwater using calcium polysulfide and sodium hydroxide. The Fifth International Conference on Remediation of Chlorinated and Recalcitrant Compounds (Monterey, Calif. May 22-25). Battelle 2006.

Parks, G. A. 1965. Isoelectric points of solid oxides, solid hydroxides, and aqueous hydroxo complex systems. Chemical Reviews, 65(2): 177-198.

Pechenyuk, SI, 1999. The use of the pH at the point of zero charge for characterizing the properties of oxide hydroxides, Russian Chemical Bulletin, 48(6): 1017-1023.

Pokrovsky OS, Schott J, Thomas F, 1999. Dolomite surface speciation and reactivity in aquatic systems, Geochemica et Cosmochimica ACTA, 63(19-20): 3133-3143.

Quinn, J. C. Geiger, C. Clausen, K. Brooks, C. Coon, S. O'Hara, T. Krug, D. Major, W. S. Yoon, A. Gavaskar, and T. Holdsworth, 2005. Field Demonstration of DNAPL dehalogenation using emulsified zero-valent iron, Environmental Science and Technology. 39 (5), 1309-1318.

Rege, S. D., and H. S., Fogler, 1988. A network model for deep bed filtration of solid particles and emulsion drops, AICHE Journal 34(11): 1761-1772.

Root, D. K., E. M. Lay and T. Ladaa. 2006. Poster abstract: Sodium persulfate ISCO applications using new methods of reagent activation. The Fifth International Conference on Remediation of Chlorinated and Recalcitrant Compounds (Monterey, Calif. May 22-25). Battelle, Columbus, Ohio.

Sahimi M., and A. O. Imdakm, 1991. Hydrodynamics of particulate motion in porous-media, Physical Review Letters, 66(9): 1169-1172.

Saleh, N., K. Sirk, Y. Liu, T. Phenrat, B. Dufour, K. Matyjaszewski, R. D. Tilton, and G. V. Lowry, 2007. Surface modifications enhance nanoiron transport and NAPL targeting in saturated porous media, Environmental Engineering Science. 24(1)45-57.

Schrick, B., B. W. Hydutsky, J. L. Blough, and T. E. Mallouk, 2004. Delivery vehicles for zerovalent metal nanoparticles in soil and groundwater, Chemistry of Materials. 16 (11): 2187-2193.

Solutions-IES, 2004. Edible Oil Emulsion for Treatment of Chlorinated Solvent Contaminated Groundwater; Technology Demonstration Plan. ESTCP, February 2004.

Soo H., and C. J. Radke, 1985. Flow of dilute, stable liquid and solid dispersions in underground porous-media, AICHE Journal 31(11): 1926-1928.

Tiraferri A and R. Sethi, 2009. Enhanced transport of zerovalent iron nanoparticles in saturated porous media by guar gum, Journal Nanoparticle Research 11(3): 635-645.

Tratnyek, P. G. and R. L. Johnson, 2006. Nanotechnologies for environmental cleanup, Nanotoday 1(2): 44-48.

US EPA, 1975. Chapter 5—Biological Denitrification. In: Parker et al. (eds.), Process Design Manual for Nitrogen Control, US Environmental Protection Agency.

Vainberg, S., R. J. Steffan, R. Rogers, T. Ladaa, D. Pohlman and D. Leigh, 2006. Presentation abstract: Production and application of large-scale cultures for bioaugmentation. The Fifth International Conference on Remediation of Chlorinated and Recalcitrant Compounds (Monterey, Calif. May 22-25). Battelle, Columbus, Ohio.

van den Berg, L., 1974. Assessment of methanogenic activity in anaerobic digestion: Apparatus and Method. Biotech. Bioeng. 16: 1459-1469.

White, B., R. Wong, S. Adams, P. Block and M. Pound, 2006. Poster abstract: Bench and pilot scale treatment of TCE by activated persulfate. The Fifth International Conference on Remediation of Chlorinated and Recalcitrant Compounds (Monterey, Calif. May 22-25). Battelle, Columbus, Ohio.

Wiedemeier, T. H., J. T. Wilson, D. H. Kampbell, R. N. Miller, and J. E. Hansen, 1995. Technical Protocol for Implementing Intrinsic Remediation with Long-Term Monitoring for Natural Attenuation of Fuel Contamination Dissolved in Groundwater. AFCEE, Brooks AFB, San Antonio, Tex., 1995.

Young, R. G. and J. M. Gossett, 1997. Effect of environmental parameters and concentrations on dechlorination of chloroethenes". Presented at the Fourth International In Situ and On-Site Bioremediation Symposium (New Orleans, La.). Batelle, Columbus, Ohio.

BRIEF SUMMARY OF THE INVENTION

In accordance with the invention there is provided a safe, low-cost, effective composition and method that can be used to increase the pH of subsurface treatment zones, increasing the effectiveness of a range of treatment processes. The composition consists, in one embodiment, of solid alkaline material, stabilizing agents and other materials where the average particle size of the composition is between 0.1 and 5 microns, the composition has a viscosity less than 2000 centipoise, and particle retention by the aquifer solids is reduced by altering the effective surface charge of the particles. The method of the invention enhances a wide variety of in situ treatment processes including aerobic and anaerobic bioremediation, chemical oxidation and reduction, and stabilization/immobilization by adjusting the pH to enhance remediation. The composition may be added to contaminated soil or groundwater in unconsolidated material or fractured rock, above or below the water table, in a variety of configurations, including permeable reactive barrier (PRB) and broad area coverage.

The characteristics of the composition allow for improved distribution of the alkaline solids away from the injection points.

Other characteristics and advantages of the invention and its various embodiments will be more fully apparent from the following detailed disclosure made with reference to the drawings.

DETAILED DISCUSSION OF PRESENTLY PREFERRED EMBODIMENTS

Figure 1:
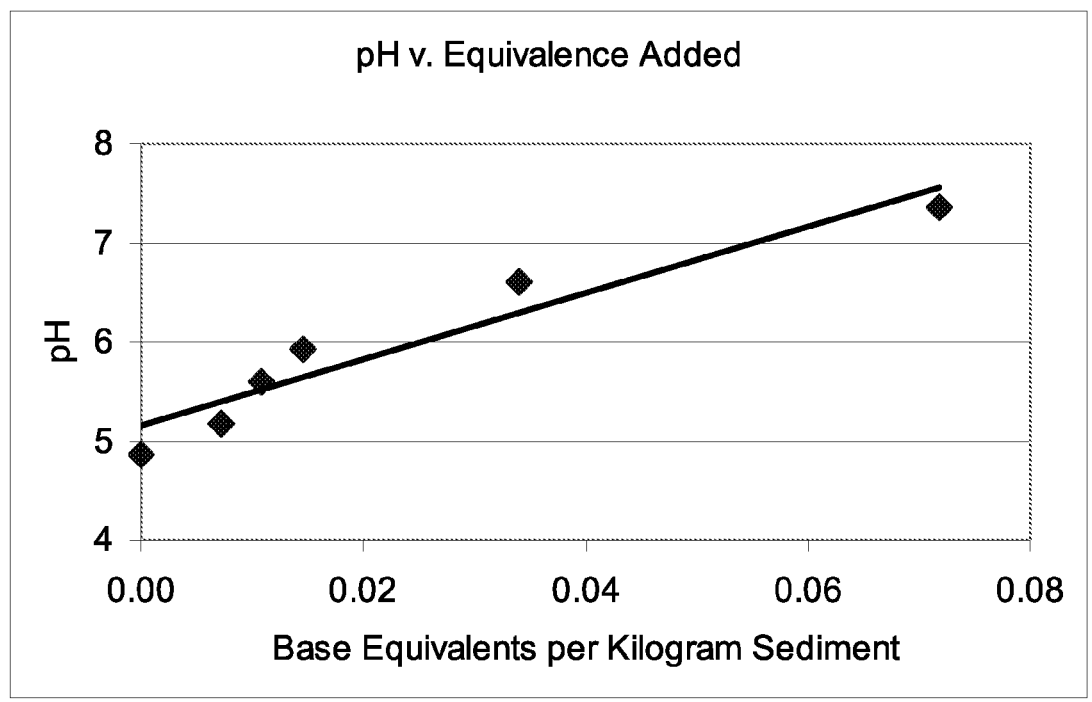
FIG. 1 is a chart showing the results of a laboratory study where varying amounts of $Mg(OH)_2$ were added to aquifer sediment and the pH was measured after equilibrating for 24 hours. Results are presented in base equivalents per kilogram of sediment.

The present invention provides a safe, low-cost, effective composition and method that can be used to increase or maintain the pH of subsurface treatment zones.

A Basic Embodiment

In its most basic embodiment, the method operates through injection and distribution of a suspension of alkaline solid material where the average particle size of the suspension is less than the median pore size or fracture aperture of the subsurface material. By increasing the pH to within a selected range, the efficacy of several different treatment processes can be enhanced including anaerobic bioremediation, aerobic bioremediation, chemical oxidation, chemical reduction, and immobilization. These different treatment processes can then be used to enhance the destruction and/or immobilization of a variety of contaminants including organic compounds, inorganic compounds, metals and radionuclides. The preferred method of this embodiment of the invention involves the preparation and distribution of the suspension throughout the target treatment zone in unconsolidated material or fractured rock above or below the water table.

In that embodiment, the pH is increased by the introduction of a solid alkaline material formulated into a suspension where the particle size, surface charge, degree of flocculation and settling rate are controlled to enhance transport and distribution throughout the treatment zone. Ideal characteristics of the suspension include: 1) median particle size less than the median pore size or fracture aperture of the subsurface material; 2) negative surface charge to reduce capture by negatively charged surfaces; 3) non-flocculating suspension to prevent formation of large flocs which could become trapped in the pores, and 4) slow settling rate to reduce separation during injection and enhance transport in the subsurface. Ideal characteristics of the alkaline solid include: 1) low cost; 2) large acid neutralizing capacity per mass material; 3) low toxicity and absence of harmful impurities; 4) slow to moderate dissolution rate to allow transport significant distances before dissolution; 5) equilibrium pH in appropriate range to achieve treatment objective.

In this first embodiment, the typical process of applying the invention involves the following steps: 1) determining the treatment zone dimensions; 2) selecting a pH required to achieve treatment objectives; 3) determining the amount of alkaline material required to increase the pH to the desired range; 4) preparing the alkaline suspension; and 5) injecting the alkaline suspension into the subsurface.

The size and dimensions of the treatment zone of this embodiment are determined based on the treatment objectives and the results of soil and/or groundwater sampling. For example, if the objective is to treat a source area, then samples of subsurface material (soil, aquifer sediment or rock) are collected at several different locations and depths and analyzed to determine if the pollutant concentrations are above allowable levels. Results of these analyses are plotted on maps or cross-sections and used to identify zones requiring treatment. If the objective is to treat a groundwater plume by forming a permeable reactive barrier, then groundwater samples are collected from monitoring wells or direct-push points to define the zone where contaminant concentrations exceed allowable levels.

The pH required to reach treatment objectives in this embodiment is determined based on the treatment process to be implemented. The optimum pH for aerobic and anaerobic treatment processes is typically in the range of about 6 to about 8 SU. The optimum pH for other treatment processes is known from prior art on each treatment process. The optimum pH can also be determined from a simple laboratory test where: a) the pH of the subsurface material is adjusted to within a specified range using common acids or bases; b) the treatment process is applied; and c) destruction or immobilization of the pollutant is monitored using standard chemical assays. The test is then repeated for a different pH until the optimum pH for treatment is determined.

The amount of alkaline material required to increase the pH to the desired range in this embodiment is determined by collecting samples of groundwater and solid subsurface material from several locations within the treatment zone. A slurry composed of equal parts groundwater and solid subsurface material is prepared and amended with varying amounts of NaOH or other alkaline material. The slurry is then allowed to equilibrate for 24 hours and then the pH is measured. A graph is then prepared showing the base equivalents required to increase the pH to different levels. Results are typically plotted as base equivalents per mass of solid subsurface material versus pH. The amount of alkaline material required is determined as:

Alkaline Material required=treatment volume×bulk density×base equivalents required×pounds per base equivalent The treatment zone volume is determined as described above. The bulk density of the subsurface material is determined by standard test procedures and typically varies between 100 and 125 pounds per cubic foot. The base equivalents required to reach the target pH is determined from the laboratory test described above. Table 1 shows the equilibrium pH and pounds of pure alkaline material per base equivalent for common solid alkaline materials that may be used in this embodiment of the invention.

TABLE 1

Properties of different alkalis used in pH adjustment.

| Alkaline material | Equilibrium pH | Pounds per base equivalent |
|---|---|---|
| MgO | 10.3 | 0.044 |
| Mg(OH)$_2$ | 9.5-10.5 | 0.064 |
| MgCO$_3$ | 8.0-8.5 | 0.093 |
| CaO | 12.5 | 0.062 |
| CA(OH)$_2$ | 11.4 | 0.082 |
| CACO$_3$ | 8.0-8.5 | 0.110 |

The alkaline material used in the process of this embodiment will be selected based on: a) the equilibrium pH; b) the pounds of alkaline material required per base equivalent; and c) the cost per pound of the alkaline material. The optimum alkaline material will have an equilibrium pH slightly higher than the required pH of the treatment process. Mixtures of alkaline materials can also be used The alkaline suspension of this embodiment is prepared from fine particulate alkaline material. Solid alkaline materials that are available include MgO, Mg(OH)$_2$, MgCO$_3$, CaO, Ca(OH)$_2$, CaCO$_3$. These materials may be purchased in a fine particulate form or specially ground to provide a median particle size less than the median pore size or fracture aperture of the subsurface material. Selection of a specific alkaline material will depend on the cost of the material and the target pH. For example, suspensions of MgO and Mg(OH)$_2$ are useful in bioremediation applications because these materials have an equilibrium pH that is slightly higher than the target pH for bioremediation and they provide a large number of base equivalents per pound of alkali. CaO and Ca(OH)$_2$ are more useful as buffering agents in chemical treatment processes since these materials generate a higher pH. CaO and Ca(OH)$_2$ may be less useful for bioremediation applications since the high pH generated by these materials may adversely impact microorganisms. Carbonates (MgCO$_3$, CaCO$_3$) can be useful for in situ precipitation processes. However, their use can result in excessive gas production with undesirable impacts on formation permeability. In some cases, the suspension may be amended with liquid or dissolved bases to provide additional alkalinity or provide a broader pH range. Liquid or dissolved alkalis that may be added include NaOH, KOH, Na$_2$CO$_3$, NaHCO$_3$, ammonium hydroxide (NH$_4$OH), ammonium carbonate ((NH$_4$)$_2$CO$_3$), sodium tripolyphosphate (NasP$_3$O$_{10}$), dibasic sodium phosphate (Na$_2$HPO$_4$) and trisodium phosphate (Na$_3$PO$_4$). Materials containing ammonia or phosphate are also beneficial in bioremediation applications as a source of inorganic nutrients.

In most cases, a concentrated alkaline suspension for this embodiment is prepared at a manufacturing facility in a conventional manner well known to those of ordinary skill. The amount of water in the suspension is minimized to reduce shipping costs. However, sufficient water is provided to hydrate the suspension and maintain a sufficiently low viscosity to allow pumping and mixing using commonly available pumps and mixers. The suspension may also be amended with chemical agents (anionic, cationic, nonionic and amphoteric/zwitterionic surfactants and coagulants) to control the surface charge and reduce flocculation of the particulate material. Chemical agents may also be added to increase the viscosity of the dispersed phase, thereby reducing agglomeration and/or settling of the particulate material. Agents that can be used to increase the viscosity include agar, lignin, alginates, arrowroot, carageenan, collagen, cornstarch, fecula, gelatin, glycerol, katakuri, pectin, tapioca, Arabic gum, guar gum, locust bean gum, xanthan gum, starch derivatives and cellulose derivatives.

Other materials may be added to the suspension to enhance in situ treatment processes including solid or liquid electron donors, electron acceptors, microbial growth factors, chemical oxidants, chemical reductants, and stabilizing agents to enhance in situ remediation processes. Organic substrates that can be provided as electron donors include short, medium and long-chain fatty acids, sugars, carbohydrates, proteins, solid fats, liquid oils, emulsified fats and oils, and other biodegradable organic substrates. Electron acceptors include peroxides, nitrates, nitrites, and/or sulfates. Microbial growth factors include inorganic nutrients, vitamins, trace minerals, and amino acids. Chemical oxidants include hydrogen and metal peroxides, peroxygens, persulfate, permanganate, and other oxidizing compounds. Chemical reductants include reactive metals, monosulfides, polysulfides, dithionites and other reducing compounds. Chemical stabilizing agents including phosphates, chemical oxidants and chemical reductants.

For this embodiment, typically a coarse suspension is prepared by mixing the materials together in a tank or kettle. Heat may be applied to aid in the initial mixing process. The coarse suspension is then passed through a high energy mixing device to reduce the size of any liquid or solid particles. Available mixing devices including high shear mixers, colloid mills and high pressure homogenizers. Multiple passes through the mixing device may be required to reduce the particle size. Once prepared, the concentrated suspension is placed in drums, totes or other suitable containers and transported to the field site.

In the field, the concentrated suspension of this embodiment is diluted with water prior to injection. The amount of concentrated suspension is selected to provide sufficient alkalinity to increase the pH of the formation to the desired range to enhance in situ treatment processes. The amount of water is selected to distribute the suspension throughout the target treatment zone. In the preferred embodiment, a concentrated alkaline suspension is prepared ahead of time in a manufacturing facility, and then diluted with water on site. However, if desired, a dilute or concentrated suspension could be prepared on site.

Once the alkaline suspension has been prepared, it is injected into the subsurface. The diluted suspension can be injected under low pressure to readily disperse the suspension away from the injection points. By diluting the suspension first with water, broader coverage and wider impact area can be achieved, using fewer injection points. Alkaline material suspensions can be injected through the end of a direct push rod, through temporary I-inch direct-push wells, or through temporary or permanent 2-inch or 4-inch conventionally-drilled wells. The suspension can also be injected using pneumatic or hydraulic fracturing.

A number of manufacturers offer direct-push equipment that can be utilized for installation of temporary 1-inch direct-push wells or direct inject of the alkaline material suspension through probe rods. Geoprobe Systems, with an address at 1835 Wall St., Salina, Kans. 67401, manufactures and sells tooling for injection of remediation products. This tooling can also be utilized to inject an alkaline material suspension. The Geoprobe® Pressure-Activated Injection Probe can be utilized with either 1.5-inch or 1.25 inch probe rods for "top-down" or "bottom-up" injection. Geoprobe Systems also sells injection Pull Caps that provide a means to make a sealed connection to the probe rods for injection while retracting the probe rod. An alternative method is to inject the alkaline material suspension "bottom-up" through the Geoprobe® rods using an expendable drive point tip.

The selection of temporary versus permanent injection points for this embodiment depends on site-specific conditions including: depth to water, drilling costs, flow rate per injection point and volume of fluid that must be injected. Injection designs should be optimized to provide the maximum injection flow rate while trying to minimize the drilling cost.

Recirculation (groundwater recovery and re-injection) can be used to eliminate or reduce the need for an accessible supply of (potable) water for mixing. Practitioners should note that the reuse of groundwater is subject to regulation by many States, and specific requirements for its treatment and/or handling may be required. Nevertheless, the most common approach in this embodiment is to pump groundwater from one or more wells and inject the groundwater along with the alkaline material suspension into one or more injection wells. The injection process is continued until the design volume has been emplaced or field pH measurements support that the alkaline material suspension has been distributed throughout the treatment zone.

When utilizing this embodiment in lower permeability formations, hydraulic and pneumatic fracturing can be used to enhance distribution of the alkaline suspension away from the injection point. Hydraulic fractures are formed when a fluid is pumped down a well at high pressures for short periods of time (hours) to create enough downhole pressure to crack or fracture the formation. The suspension or water with some specialty high viscosity fluid additives can be used as the high pressure fluid. To keep the fractures from closing when the pumping pressure is released, a propping agent such as sand or other coarse particulate material can be pumped into the formation, thereby creating a plane of high-permeability sand through which fluids can flow. The propagant remains in place once the hydraulic pressure is removed. This allows the fracture to remain open and enhances flow in the subsurface.

When utilizing this embodiment in pneumatic fracturing, a gas is pumped down a well at high pressures for short periods of time (hours) to create enough downhole pressure to crack or fracture the formation. The gas is injected into the subsurface at pressures that exceed the natural in situ pressures present in the soil/rock interface and at flow volumes exceeding the natural permeability of the subsurface.

The invention can be implemented in a variety of configurations in the subsurface, including source area treatments, plume treatments, and permeable reactive barrier (PRB) configurations. Source area and plume treatments utilizing this embodiment of the invention involve distributing the alkaline suspension and related amendments in a portion of the source area or plume to degrade contaminants and/or reduce their mobility. A PRB can be formed by distributing alkaline solids in a line generally perpendicular to groundwater flow. As groundwater passes through the PRB, the pH increases enhancing destruction and/or immobilization of the contaminants.

After injection of the suspension and other additives has been completed, the "invention" works without further operation and maintenance. The alkaline solids slowly dissolve increasing the pH to the preferred range and enhancing contaminant degradation and/or immobilization. Various implementations of this embodiment of the invention for enhancing a variety of subsurface treatment processes are described below.

To increase the pH of the formation to between about 8 and about 9.5 SU, prepare a concentrated suspension containing fine particulate $Mg(OH)_2$ with a median particle size less than 5 microns, preferably less than 3 microns containing between about 40 and about 60 percent $Mg(OH)_2$, about 0.2 to about 2.0 percent xanthan gum and about 0.1 to about 1.0 percent sodium carboxymethylcellulose with the balance composed of water (all percentages in weight per total weight). Pass the suspension 1 to 10 times, preferably 3 times through an APV Gaulin Homogenizer at a pressure of 1000 to 5000 psi, preferably 2500 psi, to physically deflocculate the suspension. Place the resulting suspension into drums, totes or other containers and transport to the field site for use. At the field site, dilute 1 part by volume concentrated suspension with about 4 to about 40 parts water, and inject the diluted suspension into the subsurface. The ratio of concentrated suspension to water in the final diluted suspension will be determined based on the calculations described above for determining the amount of base equivalents required to increase the pH. To increase the pH of the formation to between about 9.5 and about 11 SU, prepare the suspension using $Ca(OH)_2$ in place of $Mg(OH)_2$. Once the formation has been treated with sufficient suspension to increase the pH to the required level, apply subsequent remediation technologies to treat the contaminants thorough aerobic bioremediation, anaerobic bioremediation, chemical oxidation, chemical reduction, immobilization or other appropriate methods as required.

To stimulate anaerobic biodegradation by adjusting the pH and amending with organic substrates according to this embodiment, prepare a concentrated suspension containing fine particulate $Mg(OH)_2$ with a median particle size less than about 5 microns, preferably less than about 3 microns containing between about 40 and about 60 percent $Mg(OH)_2$, about 0.2 to about 2.0 percent xanthan gum and 0.1 to 1.0 percent sodium carboxymethylcellulose with the balance composed of water (all percentages in weight per total weight). Blend the concentrated suspension with a prepared emulsified oil concentrate as containing approximately 60% soybean oil, about 4 percent lactate or lactic acid, 10 percent emulsifiers, about 2 percent amino acid extracts with the balance water (all percentages in weight per total weight). Methods for preparing soybean oil emulsions for bioremediation are known to those skilled in the art of making emulsions and are described by Borden and Lee (U.S. Pat. No. 6,398,960). Blend about 60% by volume soybean oil emulsion with about 40% by volume $Mg(OH)_2$ suspension. Pass the emulsion-suspension mixture through a colloid mill or high pressure homogenizer 1 to 10 times, preferably 3 times. Place the resulting suspension into drums, totes or other containers and transport to the field site for use. At the field site, dilute 1 part by volume concentrated suspension with about 4 to about 40 parts water, and inject the diluted suspension into the subsurface. The total amount of $Mg(OH)_2$ to inject is determined by the amount of base equivalents required to increase the pH to the desired range. If additional organic substrate is required, then the concentrated emulsion-suspension can be diluted with additional emulsion concentrate in the field or a second injection can be performed to provide additional substrate.

The features of this embodiment of the present invention will be more clearly understood by reference to the following examples, which are not to be construed as limiting the invention or any embodiment thereof.

EXAMPLES

Example 1

Field Demonstration of Buffering on Aquifer pH

A pilot study was conducted to evaluate the use of emulsified oil substrate (EOS®) for the bioremediation of trichloroethylene (TCE) in a prototypical source area. The depth to ground water at the site was approximately 6 feet below ground surface (ft bgs). The subsurface material at the site consisted of 5 to 8 ft of silty sandy clay underlain by 8 to 10 ft of silty sand, with dense clay acting as a lower confining layer at approximately 16 ft bgs. The hydraulic gradient of the area was low (~0.001 ft/ft) and groundwater velocity was also low (~5 ft/yr). The hydraulic conductivity varied from 1 to 3 ft/d. A field pilot test had previously been conducted at this site to evaluate the use of emulsified oil alone to stimulate anaerobic biodegradation of TCE. However, this previous pilot test was not successful due to the low pH of the treatment zone. Samples of subsurface material collected 15 months after the initial emulsified oil injection found the pH to vary between 4.2 and 5.2 SU which is less than optimal for reductive dechlorination.

The invention of this embodiment was then employed at the site to alleviate the low pH problem and provide additional organic substrate to stimulate TCE biodegradation. Different alkalis were considered to increase the pH of the aquifer, including $Ca(OH)_2$, $Mg(OH)_2$, NaOH, $NaHCO_3$ and $Na_2CO_3$. The preferred alkaline material would provide a large amount of alkalinity per pound but not result in an excessively high pH near the point of injection. $Ca(OH)_2$, NaOH and $Na_2CO_3$ have maximum pH values of 12 or greater, which could result in toxicity due to a very high pH near the injection point. In contrast, $NaHCO_3$ would buffer the pH near optimum (7 to 8), but $NaHCO_3$ provides the least alkalinity per pound. Also, addition of $NaHCO_3$ to the acidic aquifer would result in degassing large amounts of $CO_2$, which could cause blockage of the aquifer.

Based on the characteristics of each agent, $Mg(OH)_2$ was chosen as a pH buffer. The pH of pure $Mg(OH)_2$ is ~10 SU, so the pH within most of the aquifer can be expected to vary between 6 and 8 which is optimal for biodegradation. Also, $Mg(OH)_2$ addition would require less material to inject and would not result in $CO_2$ degassing.

Aquifer sediment from the pilot test site was amended with varying amounts of $Mg(OH)_2$ and equilibrated for 24 hours to determine the amount of base equivalents needed to increase the pH to different values. FIG. 1 shows the resulting pH achieved by increasing amounts of $Mg(OH)_2$. Results are presented in base equivalents per Kg of sediment. Based on these results, the amount of $Mg(OH)_2$ required to increase the pH of the pilot test area was calculated.

Assuming uniform mixing throughout the 20 ft×20 ft×10 ft treatment volume with a sediment bulk density of 100 lb/ft$^3$, approximately 16,000 base equivalents would be required to raise the pH of the pilot test area to approximately 7 to 8 SU. This is equivalent to about 1,000 lb of pure $Mg(OH)_2$. Approximately two years had passed since the original emulsified oil injection at the site and it was determined that additional emulsified oil should be injected to increase the amount of organic carbon available for reductive dechlorination.

Two formulations were prepared:
1. Soybean oil, water, lactic acid, sodium lactate, yeast extract and food grade surfactants were blended together to form a coarse emulsion. This emulsion was then passed through a colloid mill to generate a fine emulsion with small uniform droplets. This emulsion was then blended with a $Mg(OH)_2$ slurry product (62% slurry by weight) with a median particle diameter of 3 microns at a ratio of 60% by volume soybean oil emulsion:40% $Mg(OH)_2$ slurry. The mixture was then repeatedly passed through a colloid mill while monitoring the change in particle size and suspension properties. After five passes through the colloid mill, a stable suspension was obtained and the mixed emulsion-suspension was drummed for shipment. This material had a final pH of 9.3 and density of 1,130 kg/m$^3$.

2. Powdered $Mg(OH)_2$ with a median particle diameter of 1 micron was hydrated with water (i.e., 1 part powder to 2 parts water) for several days. The hydrated powder was then mixed with the soybean oil emulsion prepared as described above. The mixture was then repeatedly passed through a colloid mill while monitoring the change in particle size and suspension properties. After five passes through the colloid mill, a stable suspension was obtained and the mixed emulsion-suspension was drummed for shipment. This material had a final pH of 9.3 and density of 1,099 kg/m$^3$.

The $Mg(OH)_2$/soybean oil suspension was injected through nineteen direct push injection points (IP). The injection points were located approximately midway between the injection points used in the previous unsuccessful pilot study. The injection was performed via the Geoprobe® Pressure-Activated Injection Probe outfitted with 1.25-inch probe rods. The concentrated suspension was first diluted in a large tank with tap water using approximately 1 part concentrate to 4 parts water. The diluted suspension was then injected under pressure from 5 "bottom-up" through the Geoprobe® rods using an expendable drive point tip.

Injections were performed by boring down to 16 ft bgs and injecting the mixture directly through the Geoprobe rod. Initial plans were to inject a total of 22 gallons of the mixture followed by 20 to 80 gallons of chase water with the fluid distributed evenly over the entire 10 saturated zone (6 to 16 ft bgs). However, groundwater was observed being pushed out of monitor wells and the ground due to displacement by the mixture. For this reason, the amount that could be injected into each point varied and the injection occurred in two separate phases. During the second phase, many of the injections occurred only at the depths where the hydraulic conductivity was greatest, which for most injection points was approximately 13 to 16 ft bgs.

Tables 2 and 3 detail the amount of mixture and chase water injected into each point.

TABLE 2

Amount of MG(OH)$_2$/soybean oil suspension and chase water injected in pilot test area in Phase 1

| Injection Point | MG(OH)$_2$/ Soybean Oil Suspension Injected (gal.) | MG(OH)$_2$/ Soybean Oil Suspension Injected (lbs) | Water Injected (gal.) | Total Injected (gal.) |
|---|---|---|---|---|
| IP 1 | 15 | 140 | 55 | 70 |
| IP 2 | 15 | 140 | 30 | 45 |
| IP 3 | 14 | 131 | 52 | 66 |
| IP 4 | 22 | 206 | 78 | 100 |
| IP 5 | 22 | 206 | 78 | 100 |
| IP 6 | 22 | 206 | 78 | 100 |
| IP 7 | 12 | 112 | 23 | 35 |
| IP 9 | 8 | 75 | 27 | 35 |
| IP 10 | 22 | 206 | 78 | 100 |
| IP 11 | 5 | 47 | 10 | 15 |

TABLE 3

Amount of MG(OH)$_2$/soybean oil suspension and chase water injected in pilot test area in Phase 2

| Injection Point | MG(OH)$_2$/ Soybean Oil Suspension Injected (gal.) | MG(OH)$_2$/ Soybean Oil Suspension Injected (lbs) | Water Injected (gal.) | Total Injected (gal.) |
|---|---|---|---|---|
| IP 8  | 5 | 47 | 10 | 15 |
| IP 12 | 33 | 309 | 67 | 100 |
| IP 13 | 20 | 187 | 39 | 59 |
| IP 14 | 5 | 47 | 10 | 15 |
| IP 15 | Not Performed | N/A | N/A | N/A |
| IP 16 | 5 | 47 | 11 | 16 |
| IP 17 | 15 | 140 | 30 | 45 |
| IP 18 | 33 | 309 | 67 | 100 |
| IP 19 | 20 | 187 | 40 | 60 |
| IP 20 | 33 | 309 | 67 | 100 |

Approximately 326 gallons (3050 lbs) of MG(OH)$_2$/soybean oil suspension were injected into the aquifer containing about 1000 lbs of pure MG(OH)$_2$ along with 850 gallons of water. Soil borings were collected immediately prior to and three months after the initial injection to determine how well the Mg(OH)$_2$/soybean oil suspension buffered the aquifer.

Table 4 shows the average pH in samples collected at each depth before and after injection. Prior to injection, the pH was less than 5.5 in 80% of the treatment zone. This low pH very likely inhibited reductive dechlorination of TCE. After injection, the pH had increased to between 6.4 and 8.0 in 80% of the treatment interval, the optimum range for reductive dechlorination. In the upper 20% of the treatment interval, the pH had increased by 0.5 to 0.6 pH units. However, it was still below optimum. Injection in this zone had less beneficial effects because the low permeability of the soil at this depth prevented injection of sufficient material.

TABLE 4

Effect of Mg(OH)$_2$/soybean oil suspension injection on Treatment zone pH

| Depth (ft bgs) | Pre-Suspension Injection Avg. ± Std. Dev. | Post-Suspension Injection Avg. ± Std. Dev. |
|---|---|---|
| 6'-7'   | 4.9 ± 0.2 | 5.6 ± 0.5 |
| 7'-8'   | 4.9 ± 0.1 | 5.5 ± 0.6 |
| 8'-9'   | 5.0 ± 0.2 | 6.4 ± 1.0 |
| 9'-10'  | 4.5       | 7.2 ± 1.0 |
| 10'-11' | 5.1 ± 0.3 | 7.0 ± 0.7 |
| 11'-12' | 4.8 ± 0.0 | 7.0 ± 0.6 |
| 12'-13' | 4.9 ± 0.3 | 7.6 ± 0.9 |
| 13'-14' | 5.3 ± 0.6 | 8.0 ± 0.9 |
| 14'-15' | 5.8 ± 0.6 | 7.8 ± 1.1 |
| 15'-16' | 6.0 ± 0.2 | 7.9 ± 1.3 |

Figure 2:
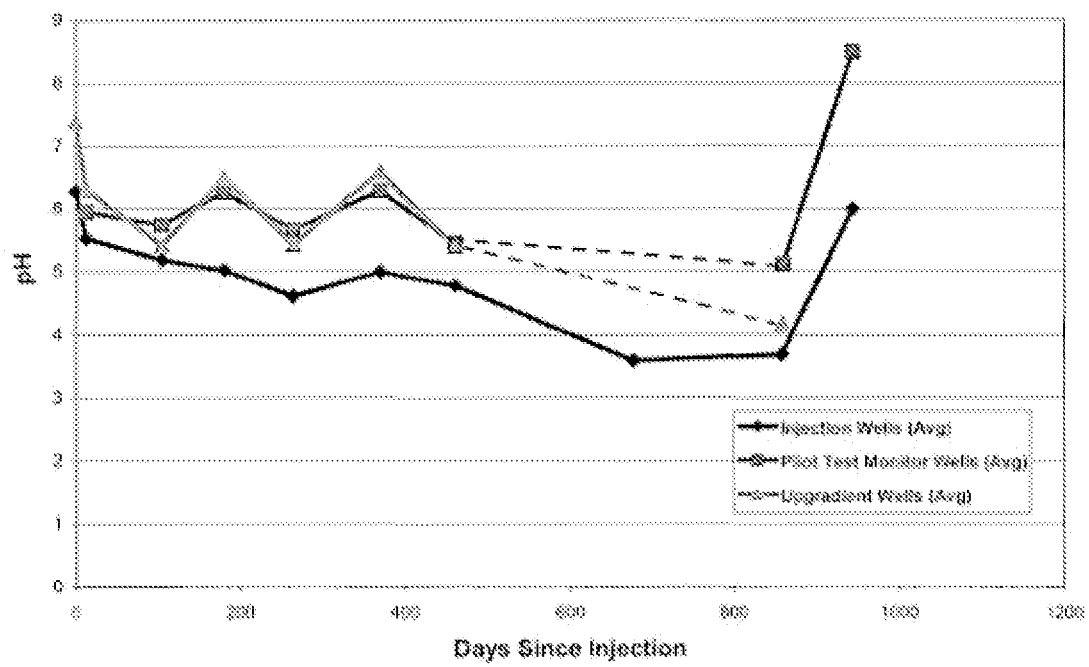
FIG. 2 is a chart showing the variation in pH in injection wells, pilot test monitor wells, and upgradient-untreated monitor wells. The pH increased to an optimal range for reductive dechlorination following injection of the Mg $(OH)_2$/soybean oil suspension between 860 and 880 days.

The average pH in monitor wells and injection wells within the pilot test area and in three upgradient, untreated wells is shown in FIG. 2. Over the first 400 days of the test, the pH in the monitor wells was approximately 6 while the pH in the injection wells was 5 or less. However, by about 700 days, the pH in the monitor wells had dropped to near 5 and the average pH in the injection wells was less than 4. Between 860 and 880 days, the Mg(OH)$_2$/soybean oil suspension was injected resulting in a sharp increase in pH to 6 in the injection wells and over 8 in the monitor wells generating good conditions for reductive dechlorination within the pilot test area. Field monitor data showed that as pH increased, and as a result of the increase, desired biodegradation reaction occurred at effective levels.

Example 2 pH Adjustment to Improve In Situ Aerobic and Anaerobic Bioremediation at a Hazardous Waste Site A large hazardous waste site was contaminated with a complex mixture of organic contaminants including aromatic hydrocarbons (benzene, toluene, ethylbenzene, xylenes), chlorobenzene, dichlorobenzene isomers, acetone, methyl ethyl ketone, 4-methyl-2-pentanone, 1,1,1-trichloroethane, cis-1,2-dichloroethene, chloroform, 1,2-dichloroethane, 1,1-dichloroethane, methylene chloride, tetrachloroethene, and trichloroethene. Laboratory microcosm studies demonstrated that all these pollutants could be biodegraded using a sequential aerobic-anaerobic treatment process. However, during the aerobic phase, the pH dropped to 5 or less, slowing biodegradation.

Biodegradation processes could be enhanced at the site by injecting a Mg(OH)$_2$ suspension with a median particle size less than the median pore size of the sediment to increase the pH of the aquifer to between 7 and 8. Oxygen could then be supplied by a variety of different processes including injection of solid oxygen releasing materials (calcium or magnesium peroxide), recirculation of aqueous solutions containing dissolved oxygen or hydrogen peroxide, air sparging, or dewatering followed by bioventing. Once the aerobically biodegradable contaminants were reduced, anaerobic biodegradation processes could be enhanced by injection of liquid organic substrates or emulsified oils.

Example 3 pH Adjustment for Enhanced Attenuation at a Petroleum Release

Common groundwater contaminants associated with gasoline and other petroleum releases include benzene, toluene, ethylbenzene, xylenes (BTEX), 1,2,4- and 1,3,5-trimethylbenzene, n-butylbenzene, n-propylbenzene and naphthalene. All of these compounds are known to be readily biodegradable under aerobic and/or anaerobic conditions (Borden, 1994). Numerous laboratory and field studies have shown that these contaminants can biodegrade without human intervention through a process termed "Natural Attenuation". However, low pH conditions can slow or stop natural attenuation.

Natural attenuation processes could be enhanced by injecting a low solubility alkaline solid into the aquifer to increase the pH providing conditions more suitable for petroleum hydrocarbon biodegradation. As the solid slowly dissolves over time, it would provide a long term source of alkalinity to maintain a neutral or slightly alkaline pH and enhance biodegradation processes. Sufficient alkaline solid would be injected to last the entire life of the groundwater plume eliminating the need for any further treatment. The alkaline solid would be prepared as an aqueous suspension with a median particle size less than the median pore size of the aquifer material and would be injected into a series of permanent or temporary wells. These wells could be located within the contaminant source area or in a barrier configuration, intersecting the contaminant plume perpendicular to groundwater flow.

Example 4

Metals Immobilization in Source Areas and Barriers

A variety of metals including iron (Fe), manganese (Mn), titanium (Ti), vanadium (Va) chromium (Cr), cobalt (Co), nickel (Ni), molybdenum (Mo), copper (Cu), silver (Ag), zinc (Zn), cadmium (Cd), mercury (Hg), and lead (Pb) may be present in groundwater at undesirable levels. These material may enter groundwater from a variety of sources including metal working operations, acid mine drainage, dissolution of natural minerals and numerous other sources. These metals are most mobile under low pH, acidic condition. However, at neutral to basic pH, these metals can be removed from solution through formation of insoluble metal hydroxides, metal carbonates and/or sorption onto metal oxide surfaces. As a result, the mobility and hazard associated with these metals can be reduced by adding alkaline solids to increase the pH and provide a long term source of alkalinity to maintain an elevated pH.

Source areas above and below the water table can be treated by preparing an aqueous suspension of $Ca(OH)_2$ with a median particle size less than the median pore size of the sediment. The suspension is amended with xanthan gum and sodium carboxymethylcellulose to increase the dispersed phase viscosity to between 3 and 10 centipoise. This increase in viscosity is sufficient to prevent rapid settling of the $Ca(OH)_2$ particles while maintaining a viscosity sufficiently low to allow easy injection into most geologic formations. The aqueous suspension is then passed three times through a high pressure homogenizer at a pressure of 2500 psi to deflocculate the suspension. The suspension is then injected into the subsurface through a series of temporary or permanent injection wells.

The amount of water to be injected is based on the dimensions of the treatment zone and the effective porosity of the formation. The amount of $Ca(OH)_2$ to be injected is selected by the following process, in this embodiment. First, the target pH of the remediation process is selected to reduce the metal concentration to acceptable levels due to precipitation of insoluble metal hydroxides and enhanced sorption to naturally occurring minerals. Second, groundwater and formation samples are titrated with NaOH to determine the milliequivalents of base required to reach the target pH. Third, the milliequivalents of NaOH is converted to the amount of $Ca(OH)_2$ required. Additional $Ca(OH)_2$ should be provided to account for acidity carried into the treatment zone over the design life of the treatment process. The ratio of $Ca(OH)_2$ to water is commonly between 1:100 and 1:10 in this embodiment. However, ratios outside this range may be required depending on the acidity of the water and geologic material. There are a variety of modifications that can be used to enhance the effectiveness of the approach described above including injection of a mixture of hydroxides ($Ca(OH)_2$ and $Mg(OH)_2$ and carbonates ($NaHCO_3$, $CaCO_3$ and $MgCO_3$).

Dissolved plumes of groundwater containing undesirable levels of metals can be treated in situ through formation of a permeable reactive barrier. In this approach, a line of temporary or permanent wells are installed perpendicular to groundwater flow and extending across the plume. A suspension of alkaline solids and water is injected through each well. The alkaline solids are transported away from the well by the flowing water and are distributed throughout the formation resulting in a zone of elevated pH. As groundwater flows through this elevated pH zone, the metals precipitate as insoluble metal hydroxides, carbonates or are sorbed to the surfaces of naturally occurring minerals. The amount of water injected is selected to distribute the suspension throughout the required radius of influence around the injection well. The amount of alkaline solids is selected to adjust the pH of the geologic formation and any groundwater that flows through the barrier of the design life of the system.

Example 5

High pH Activated Chemical Oxidation

A wide variety of organic chemical contaminants can be treated in situ using persulfate in combination with high pH including chlorinated ethenes, ethanes, and methanes, mono- and polynuclear aromatic hydrocarbons, oxygenates, petroleum hydrocarbons, chlorobenzenes, phenols, pesticides, herbicides, ketones and polychlorinated biphenyls (FMC, 2006; Block et al., 2006, US Patent Application 20060054570). However, achieving a high pH in the subsurface can be difficult due to the strong buffering capacity of many subsurface materials.

Contaminated subsurface zones could be treated according to this embodiment of the invention, using a two stage process. First, an aqueous suspension of $Ca(OH)_2$ with a median particle size less than the median pore size of the sediment would be distributed throughout the treatment zone. Sufficient $Ca(OH)_2$ would be injected to increase the pH to at least 10.5. Next, a solution containing monopersulfates and/or dipersulfates is distributed using the same wells. The high pH generated by the $Ca(OH)_2$ activates the persulfate resulting in formation of sulfate radicals with rapidly oxidize the target pollutants. If contaminant concentrations rebound over time, additional persulfate can be injected without the need to add additional $Ca(OH)_2$.

Example 6

In Situ Formation of Metal Peroxide Treatment Zones

Looney et al. (2007, U.S. Pat. No. 7,160,471) describes a method for in situ creation of metal peroxides where naturally occurring or anthropogenic alkaline earth metals are treated with energetic oxidizing free radicals. The metal peroxides then slowly decompose over time releasing oxygen to stimulate aerobic biodegradation processes and/or maintain oxidizing conditions to immobilize certain metals (Koenigsberg et al., 1993, U.S. Pat. No. 5,264,018).

In situ treatment zones could be created according to this embodiment using an enhancement of the approach described by Looney et al. (2007) where an aqueous suspension of $Ca(OH)_2$ with a median particle size less than the median pore size of the sediment is first distributed throughout the treatment zone to increase the pH to at least 10.5. Next, a solution containing monopersulfates and/or dipersulfates is distributed using the same wells. The high pH generated by the $Ca(OH)_2$ activates the persulfate resulting in formation of sulfate radicals. These sulfate radicals oxidize the $Ca(OH)_2$ and other alkaline earth materials resulting in the formation of metal peroxides and other oxidized minerals. These metals peroxides and oxidized minerals then provide a long term source of oxygen enhancing aerobic biodegradation processes and immobilizing certain metals. An important advantage of this process over the invention of Looney et al. (2007) is that the high pH provided by the $Ca(OH)_2$ reduces the rate of metal peroxide decomposition, increasing the operating life of the treatment zone.

A Further Embodiment

As hereinabove stated, embodiments of the present invention provides a safe, low-cost, effective composition that can be used to increase or maintain the pH of subsurface treatment zones. The composition of the embodiment that now will be discussed consists of solid alkaline material, stabilizing agents and other materials. The composition can be used to improve the performance of a wide variety of in situ processes for treatment of organic compounds, inorganic compounds, metals and radionuclides including aerobic and anaerobic bioremediation, chemical oxidation and reduction, and stabilization/immobilization. The composition may be added to contaminated soil or groundwater in unconsolidated material or fractured rock, above or below the water table, in a variety of configurations, including permeable reactive barrier (PRB) and broad area coverage.

The composition of this embodiment comprises alkaline solid material and stabilizing agents wherein the average, or median, particle size of the composition is between 0.1 and 5 microns. Preferably, the composition has a viscosity less than 2000 centipoise, and particle retention by the aquifer solids is reduced by altering the effective surface charge of the particles.

By increasing the pH of the target treatment zone to within a selected range, the efficacy of several different treatment processes can be enhanced including anaerobic bioremediation, aerobic bioremediation, chemical oxidation, chemical reduction, and immobilization. These different treatment processes can then be used to enhance the destruction and/or immobilization of a variety of contaminants including organic compounds, inorganic compounds, metals and radionuclides. The preferred method of the invention involves the preparation and distribution of the suspension throughout the target treatment zone in unconsolidated material or fractured rock above or below the water table.

The composition is formulated so that the surface charge, degree of flocculation and settling rate are controlled to enhance transport and distribution through subsurface treatment zones in unconsolidated material or fractured rock, above or below the water table. Characteristics of the composition and reasons why these characteristics presently are believed to operatively improve performance of the composition include: 1) median particle size is between 0.1 and 5 microns to reduce settling during transport through the pore spaces while also reducing collisions with the subsurface solids due to Brownian motion; 2) the surfaces of the solid particles are treated to reduce attraction between the particles and the negatively charged surfaces of subsurface material; 3) particles in the composition do not form large flocs which could form dendrites clogging the pores, 4) the composition is prepared in a manner to reduce particle settling to enhance transport in the subsurface, 5) the composition is prepared in a manner to reduce separation during storage, transport and injection, and 6) the fluid viscosity is less than 2000 centipoise to reduce back pressure during injection. Additional beneficial characteristics of the composition include: 1) low cost; 2) large acid neutralizing capacity per mass; 3) low toxicity; 4) slow to moderate dissolution rate to allow transport for significant distances before dissolution; 5) equilibrium pH in appropriate range to achieve treatment objective.

It should be noted that the preferred way to measure average particle size, or median particle size (also referred to as the median particle diameter), as the terms are used herein, is to use a volume-weighted median, such that 50% by weight of the particles have a smaller volume equivalent diameter and 50% by weight of the particles have a larger volume equivalent diameter. Median pore size is determined in equivalent manner as is evident to persons skilled in the art. This method is illustrated, for example, in Coulibaly and Borden (2004), wherein for example Table 1 shows the $D_{50}$ calculated according to this method, FIG. 1 shows the cumulative weight and the 50% point is the median particle size based on this method of calculation, FIG. 2 illustrates the cumulative volume fraction of sediment pores and the 50% point would be the median pore size based on this method of calculation, and in FIG. 5, which illustrates cumulative volume fraction of emulsion droplets, if all the droplets have the same density (assumed true), then cumulative volume fraction is identical to cumulative weight fraction and the 50% point would be the median particle size based on this method of calculation. (In contrast, the median value referred to in shorthand form in Table 3 is the arithmetic mean rather than the volumetric mean, which is why the volume fraction graphs is plotted in FIG. 5 of the article.) The inventor has determined that suspensions measured on the basis of median particle size in this preferred manner produce optimum results for purposes of the invention.

The invention further involves a method for increasing the pH by the introduction of the described composition into the subsurface. The typical process of applying the invention involves the following steps: 1) determining the treatment zone dimensions; 2) selecting a pH required to achieve treatment objectives; 3) determining the amount of alkaline material required to increase the pH to the desired range; 4) preparing the alkaline suspension; and 5) injecting the alkaline suspension into the subsurface.

The size and dimensions of the treatment zone are determined based on the treatment objectives and the results of soil and/or groundwater sampling. For example, if the objective is to treat a source area, then samples of subsurface material (soil, aquifer sediment or rock) are collected at several different locations and depths and analyzed to determine if the pollutant concentrations are above allowable levels. Results of these analyses are plotted on maps or cross-sections and used to identify zones requiring treatment. If the objective is to treat a groundwater plume by forming a permeable reactive barrier, then groundwater samples are collected from monitoring wells or direct-push points to define the zone where contaminant concentrations exceed allowable levels.

The pH required to reach treatment objectives is determined based on the treatment process to be implemented. The optimum pH for aerobic and anaerobic treatment processes is typically in the range of about 6 to about 8 SU. The optimum pH for other treatment processes is known from prior art on each treatment process. The optimum pH can also be determined from a simple laboratory test where: a) the pH of the subsurface material is adjusted to within a specified range using common acids or bases; b) the treatment process is applied; and c) destruction or immobilization of the pollutant is monitored using standard chemical assays. The test is then repeated for a different pH until the optimum pH for treatment is determined.

The amount of alkaline material required to increase the pH to the desired range preferably is determined by collecting samples of groundwater and solid subsurface material from several locations within the treatment zone. A slurry composed of equal parts groundwater and solid subsurface material is prepared and amended with varying amounts of NaOH or other alkaline material. The slurry is then allowed to equilibrate for 24 hours and then the pH is measured. A graph is then prepared showing the base equivalents required to increase the pH to different levels. Results are typically plotted as base equivalents per mass of solid subsurface material.

The composition is prepared from fine particulate solid alkaline material and stabilizing agents. Solid alkaline materials that may be used include MgO, $Mg(OH)_2$, $MgCO_3$, CaO, $Ca(OH)_2$, $CaCO_3$. These materials may be purchased in a fine particulate form or specially ground so that the median particle size of the composition is less than 5 microns. Using particles of this size operates to reduce settling during storage, injection, and transport through the sediment pore spaces. All of these solid alkaline materials have a specific gravity greater than 2 which results in rapid settling of the particles in the sediment pores unless appropriate methods are used to control settling.

Selection of a specific alkaline material will depend on the cost of the material and the target pH. Table 5 shows the equilibrium pH, pounds of pure alkaline material per base equivalent, and specific gravity of common solid alkaline materials that may be used in this invention. MgO and $Mg(OH)_2$ are useful in bioremediation applications because these materials have an equilibrium pH that is slightly higher than the target pH for bioremediation and they provide a large number of base equivalents per pound of alkali. CaO and $Ca(OH)_2$ are more useful in chemical treatment processes since these materials generate a higher pH. CaO and $Ca(OH)_2$ may be less useful for bioremediation applications since the high pH generated by these materials may adversely impact microorganisms. Carbonates ($MgCO_2$, $CaCO_2$) can be useful for in situ precipitation processes. However, their use can result in excessive gas production with undesirable impacts on formation permeability.

TABLE 5

Properties of different alkalis used in pH adjustment.

| Alkaline material | Equilbrium pH | Pounds per base equivalent | Specific Gravity |
|---|---|---|---|
| MgO | 10.3 | 0.044 | 3.6 |
| $Mg(OH)_2$ | 9.5-10.5 | 0.064 | 2.3 |
| $MgCO_3$ | 8.0-8.5 | 0.093 | 3.0 |
| CaO | 12.5 | 0.062 | 3.3 |
| $Ca(OH)_2$ | 11.4 | 0.082 | 2.2 |
| $CaCO_3$ | 8.0-8.5 | 0.110 | 2.7-2.8 |

The solid alkaline material used to prepare the composition will be selected based on: a) the equilibrium pH; b) the pounds of alkaline material required per base equivalent; and c) the cost per pound of the alkaline material. The optimum alkaline material will have an equilibrium pH somewhat higher than the required pH to be achieved in the subsurface. Mixtures of alkaline materials can also be used.

In some cases, the composition may be amended with liquid or dissolved bases to provide additional alkalinity or provide a broader pH range. Liquid or dissolved alkalis that may be added include NaOH, KOH, $Na_2CO_3$, $NaHCO_3$, ammonium hydroxide ($NH_4OH$), ammonium carbonate (($NH_4)_2CO_3$), sodium tripolyphosphate ($Na_5P_3O_{10}$), dibasic sodium phosphate ($Na_2HPO_4$) and trisodium phosphate ($Na_3PO_4$). Materials containing ammonia or phosphate are also beneficial in bioremediation applications as a source of inorganic nutrients.

The composition is formulated so that the particle size, surface charge, degree of flocculation and settling rate are controlled to enhance transport and distribution through subsurface treatment zones in unconsolidated material or fractured rock above or below the water table. Characteristics of the composition include: 1) the surfaces of the solid particles are treated to reduce attraction between the particles and the negatively charged surfaces of subsurface material; 3) particles in the composition do not form large flocs which could become trapped in the pores, and 4) the composition is prepared in a manner to reduce particle settling to enhance transport in the subsurface.

In most cases, the composition is prepared at a manufacturing facility in a conventional manner well known to those of ordinary skill. The amount of water in the composition is minimized to reduce shipping costs. However, sufficient water is provided to hydrate the suspension and maintain a sufficiently low viscosity to allow pumping and mixing using commonly available pumps and mixers. The alkaline solids are amended with one or more chemical agents to reduce the attraction: a) between the alkaline particles and the negatively surface charged surfaces of subsurface material; and b) between the different alkaline particles in the composition. Achieving both of these objectives is difficult since amendments that reduce the attraction between the particles and negatively charges surfaces often result in an increase the in the attraction between two alkaline particles. The following approaches are effective in achieving these competing goals.

The alkaline solids containing Mg and Ca are stabilized by treating the solids with a fatty acid or salt of fatty acid with at least ten carbon atoms, preferably sodium or potassium oleate containing sixteen carbon atoms. Both Mg and Ca oleate have a very low aqueous solubility so the oleate precipitates on the surface of the alkaline solid generating a hydrophobic surface. The suspension of oleate treated alkaline solids may then be stabilized using surfactants well known to those skilled in the art including monoglycerides, diglycerides, polysorbates, sorbitan esters, and lecithin.

The alkaline solids are coated with a layer of vegetable oil and formed into an oil-in-water emulsion to reduce settling by reducing the effective specific gravity of the particles, preferably to less than 1.4. The average specific gravity of the particle is controlled by varying the ratio of the dense alkaline solids to the less dense oil. The average specific gravity of a particle will be equal to the volume fraction alkaline solids times the alkaline solids specific gravity plus the volume fraction oil times the oil specific gravity. For example, $Mg(OH)_2$ alkaline solids with a median particle diameter of 2.0 microns can be encased in oil droplets with a median diameter of 4.83 microns to generate particles that are 7% by volume $Mg(OH)_2$ and 93% vegetable oil with a specific gravity of 1.00 that do not float or settle in the sediment pore spaces. The emulsion is stabilized with emulsifiers well known to those skilled in the art and passed through a homogenizer, high shear mixer or colloid mill until the desired median particle diameter is achieved. The average thickness of the oil layer is controlled by the ratio of $Mg(OH)_2$ solids to oil in the composition.

The alkaline solids are coated with a layer of manganese, iron or aluminum oxide or hydroxide by adding acidic solutions of these metals to a suspension of $Ca(OH)_2$ or $Mg(OH)_2$. The metals precipitate on the alkaline solid surfaces, generating a thin surface layer with a negative surface charge under alkaline conditions. This negative surface charge reduces particle-particle collisions, flocculation and settling. At the same time, the negative surface charge reduces collisions with naturally occurring manganese, iron and aluminum oxides and hydroxides, enhancing transport through the subsurface pores. Transport may be further enhanced through addition of polyphosphates, improving dispersion and transport.

The alkaline solids can stabilized using polyacrylates and polysulfonates, preferably lignosulfonates produced during paper production. Lignosulfonates are large humic molecules with a large number of anionic groups on their surface. The lignosulfonates loosely attach to the positively charged alkaline solid surfaces, increasing the effective hydrated radius of the particle, lowering the effective specific gravity of the combined lignosulfonate-alkaline particle, and generating a new mixed particle with a negative surface charge. This negative surface charge reduces particle-particle collisions, flocculation and settling. At the same time, the negative surface charge reduces collisions with naturally occurring manganese, iron and aluminum oxides and hydroxides, enhancing transport through the subsurface pores.

Chemical agents may be added to the composition to increase the viscosity of the dispersed phase, reducing settling of the particulate material. However, the maximum viscosity must be less than 2000 centipoise to prevent excessive pressure buildup during injection. Agents that can be used to increase the viscosity include agar, lignin, alginates, arrowroot, carageenan, collagen, cornstarch, fecula, gelatin, glycerol, katakuri, pectin, tapioca, Arabic gum, guar gum, locust bean gum, xanthan gum, starch derivatives and cellulose derivatives.

Other materials may be added to the composition to enhance in situ treatment processes including solid or liquid electron donors, electron acceptors, microbial growth factors, chemical oxidants, chemical reductants, and stabilizing agents to enhance in situ remediation processes. Organic substrates that can be provided as electron donors include fatty acids, sugars, carbohydrates, proteins, solid fats, liquid oils, emulsified fats and oils, and other biodegradable organic substrates. Electron acceptors include peroxides, nitrates, nitrites, and/or sulfates. Microbial growth factors include inorganic nutrients, vitamins, trace minerals, and amino acids. Chemical oxidants include hydrogen and metal peroxides, peroxygens, persulfate, permanganate, and other oxidizing compounds. Chemical reductants include reactive metals, monosulfides, polysulfides, dithionites and other reducing compounds. Chemical stabilizing agents including phosphates, chemical oxidants and chemical reductants.

Typically, a coarse suspension of alkaline solids and stabilizing agents is prepared by mixing the materials together in a tank or kettle. Heat may be applied to aid in the initial mixing process. The coarse suspension is then passed through a high energy mixing device to reduce the size of any liquid or solid particles. Available mixing devices including high shear mixers, colloid mills and high pressure homogenizers. Multiple passes through the mixing device may be required to reduce the median particle size of the final composition to between 0.1 and 5 microns. Once prepared, the composition is placed in drums, totes or other suitable containers for shipment.

In the field, the composition is typically diluted with water prior to injection. The amount of the composition is selected to provide sufficient alkalinity to increase the pH of the formation to the desired range to enhance in situ treatment processes. The amount of water is selected to distribute the composition throughout the target treatment zone. In the preferred embodiment, the composition is prepared ahead of time in a manufacturing facility, and then diluted with water on site. However, if desired, the composition could be prepared on site.

The composition can be applied to the subsurface in a variety of configurations including source area treatments, plume treatments, and permeable reactive barrier (PRB) configurations. Source area and plume treatments involve distributing the alkaline suspension and related amendments in a portion of the source area or plume to enhance treatment. A PRB can be formed by distributing the composition through a line of wells generally perpendicular to groundwater flow. As groundwater passes through the PRB, the pH increases enhancing destruction and/or immobilization of the contaminants.

After injection of the composition has been completed, the "invention" works without further operation and maintenance. The alkaline solids present in the composition slowly dissolve increasing the pH to the preferred range and enhancing contaminant treatment.

Preferred embodiments of this invention for enhancing a variety of subsurface treatment processes are described below.

To increase the pH of the formation to between about 8 and about 9.5 SU, prepare an alkaline suspension composition by mixing 40 to 60% by weight colloidal $Mg(OH)_2$ powder with a median particle size less than 5 microns, preferably less than 3 microns and 0.1 to 0.5% potassium oleate formed into a paste with water, and the balance water. Mix in a large kettle at 25-30° C. and then pass the suspension 1 to 10 times, preferably 3 times through an APV Gaulin Homogenizer at a pressure of 1000 to 5000 psi, preferably 2500 psi, to physically deflocculate the suspension. Place the resulting suspension into drums, totes or other containers and transport to the field site for use. At the field site, dilute 1 part by volume concentrated suspension with about 4 to about 40 parts water, and inject the diluted suspension into the subsurface. The ratio of concentrated suspension to water in the final diluted suspension will be determined based on the calculations described above for determining the amount of base equivalents required to increase the pH. To increase the pH of the formation to between about 9.5 and about 11 SU, prepare the suspension using $Ca(OH)_2$ in place of $Mg(OH)_2$. Once the formation has been treated with sufficient suspension to increase the pH to the required level, apply subsequent remediation technologies to treat the contaminants thorough aerobic bioremediation, anaerobic bioremediation, chemical oxidation, chemical reduction, immobilization or other appropriate methods as required.

To stimulate anaerobic biodegradation by adjusting the pH and amending with organic substrates, prepare a composition by first blending one part colloidal $Mg(OH)_2$ powder with an average diameter less than 3 microns (available from Martin Marietta Magnesia Specialties, Baltimore, Md.) with two to four parts bleached, refined soybean oil to form Mix 1. Next, blend 6 to 12% food grade glycerol, 6 to 10% glycerol monooleate, 10 to 15% polysorbate 20, with the balance mixed in a kettle. Next, slowly add 1 part Mix 1 to 2 to 5 parts Mix 2 while vigorously blending. Pass the emulsion-suspension mixture through a colloid mill or high pressure homogenizer 1 to 10 times, preferably 3 times, until the resulting composition has a median particle size less than 5 microns. Place the resulting suspension into drums, totes or other containers and transport to the field site for use. At the field site, dilute 1 part by volume concentrated suspension with about 4 to about 40 parts water, and inject the diluted suspension into the subsurface. The total amount of $Mg(OH)_2$ to inject is determined by the amount of base equivalents required to increase the pH to the desired range. If additional organic substrate is required, then the concentrated emulsion-suspension can be diluted with additional emulsion concentrate in the field or a second injection can be performed to provide additional substrate.

With the foregoing description of these further embodiments in mind, features of the present invention may be more clearly understood by reference to the following additional examples, which are not to be construed as limiting any aspect of the invention.

ADDITIONAL EXAMPLES

Example 7

Preparation of a $Mg(OH)_2$ Suspension

One method of preparing a alkaline suspension using $Mg(OH)_2$ powder is described. An alkaline suspension composition was prepared by mixing: 500 g of colloidal $Mg(OH)_2$ powder with an average, or median, diameter less than 3 microns (available from Martin Marietta Magnesia Specialties, Baltimore, Md.), 20 mL of 40% by weight Potassium Oleate paste (available from Sigma-Aldrich, St. Louis, Mo.) and 500 g of warm water (25-30 C) and blending in a table top mixer for 5 minutes on high speed. 5 g of polysorbate 20 (available from Lambent Technologies, Gurnee, Ill.) was then added and mixed for an additional 5 min at high speed. The suspension was observed to be stable at room temperature for 28 days with little settling and a median particle size less than 5 micron.

Example 8

Preparation of a $Ca(OH)_2$ Suspension

One method of preparing an alkaline suspension using $Ca(OH)_2$ powder is described. An alkaline suspension composition was prepared by mixing: 500 g of colloidal $Ca(OH)_2$ powder with a median diameter of 2 microns (available from Mississippi Lime, St. Louis, Mo.), 0.05 Norlig A lignosulfonate (available from Borregaard LignoTech, Rothschild, Wis.) and 500 mL of water and blending in a table top mixer for 5 minutes on high speed. The suspension was observed to be stable at room temperature for 28 days with little settling and a median particle size less than 5 micron.

Example 9

Preparation of a $Mg(OH)_2$ Suspension and Vegetable Oil

One method of preparing an alkaline suspension of the present invention using $Mg(OH)_2$ powder and vegetable oil is described. An alkaline suspension composition was prepared in steps. In step 1, 150 g of colloidal $Mg(OH)_2$ powder with an average diameter less than 3 microns (available from Martin Marietta Magnesia Specialties, Baltimore, Md.) was slowly added to 400 g of bleached, refined soybean oil while slowly blending to form Mix 1. In step 2, 36 g food grade glycerol, 25 g glycerol monooleate (available from Lambent Technologies, Gurnee, Ill.), and 38 g polysorbate 20 (available from Lambent Technologies, Gurnee, Ill.) were added to 303 mL water and mixed in a table top blender on high for 2 minutes to form Mix 2. In step 3, Mix 1 was slowly added to Mix 2 in a table top mixer on high speed for 5 min. This mixture was then passed one or more times through a colloid mill until the median particle size is less than 5 microns. The final suspension was observed to be stable at room temperature for 28 days with little settling and a median particle size less than 5 microns.

Example 10

Preparation of a $CaCO_2$ Suspension

One method of preparing an alkaline suspension of the present invention using $CaCO_2$ powder is described. An alkaline suspension composition was prepared by mixing: 500 g of precipitated calcium carbonate slurry with a median diameter less than 1 micron (available from Mississippi Lime, St. Louis, Mo.) and 1 g of $FeCl_3$ (available from Fisher Scientific, Pittsburg, Pa.), and blended for 5 minutes at low speed in a table top mixer. This mixture was then amended with 0.1 g of hexametaphosphate (available from Fisher Scientific, Pittsburg, Pa.) and mixed for an additional 5 minutes on high speed. The suspension was observed to be stable at room temperature for 28 days with little settling and a median particle size less than 5 micron.

Example 11

Laboratory Evaluation of Suspension Transport

Figure 3:
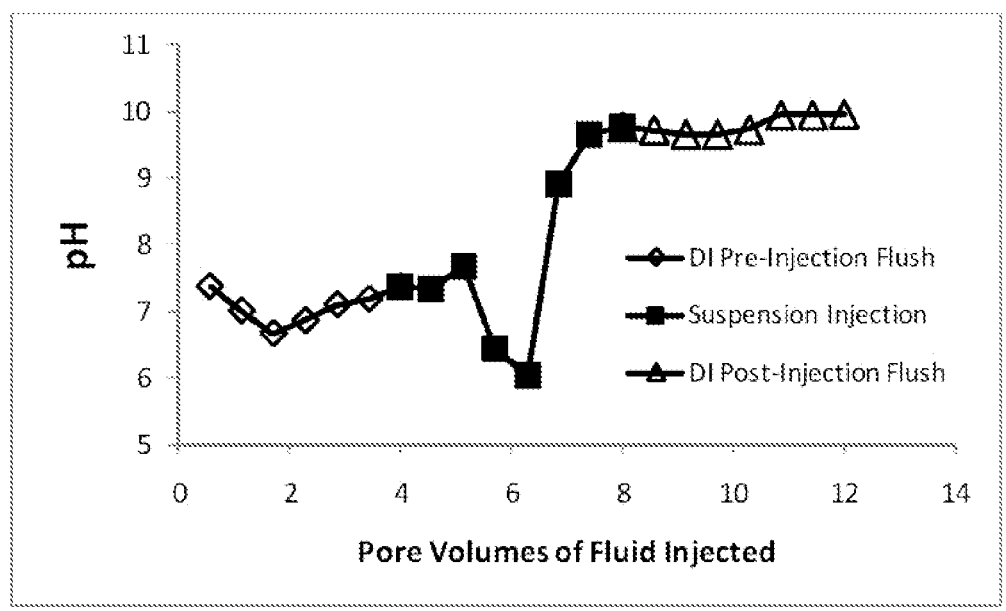
FIG. 3 is a graph showing the change in pH in the effluent of an experimental soil column during injection of four pore volumes (PV) of deionized (DI) water, four PV of $Mg(OH)_2$ suspension, and four PV of DI water.
Figure 4:
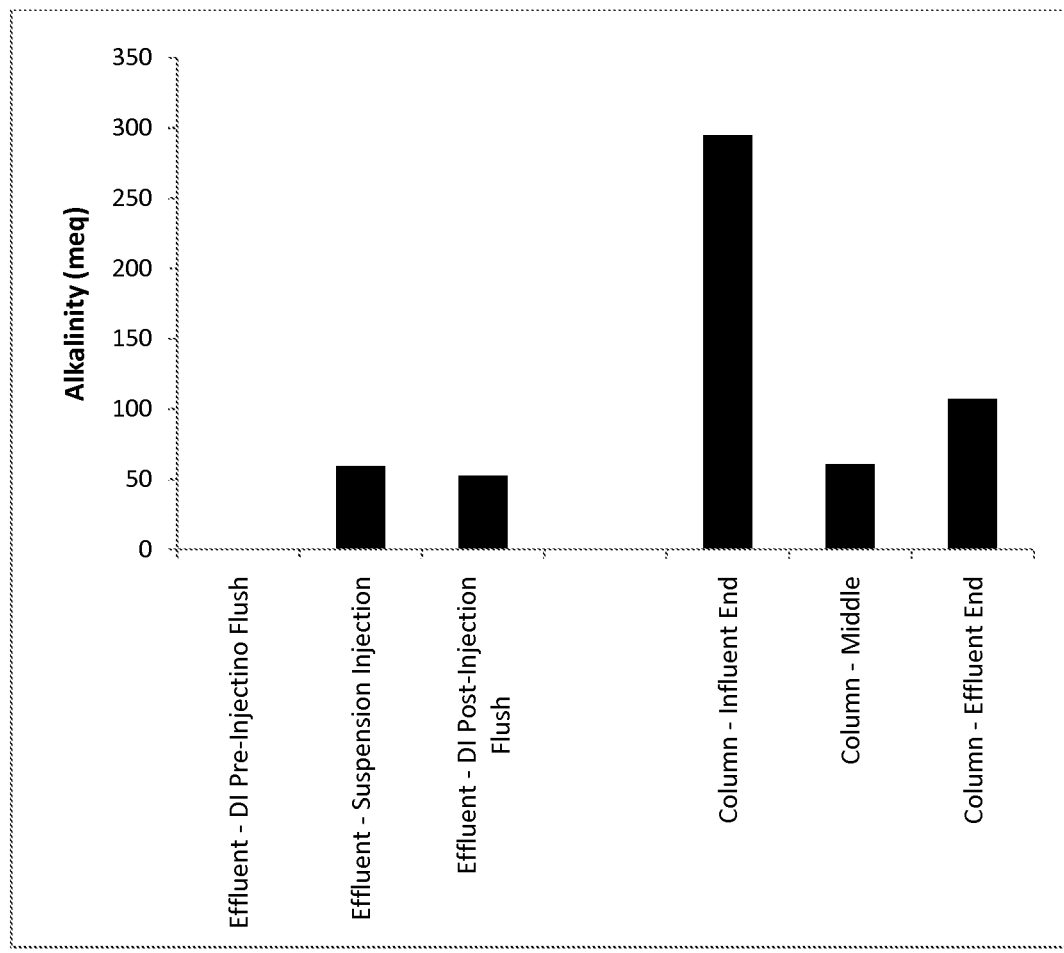
FIG. 4 is a graph showing the distribution of $Mg(OH)_2$ alkalinity between the amount injected into the experimental column, the amount in the column effluent and the amount retained by the soil after completion of the experiment.

A laboratory test was run to demonstrate the transport properties of the inventive alkaline suspension. A ten inch long by 1 inch diameter clear PVC column was packed with sand with a median particle diameter of 0.4 mm and saturated with water. A diluted suspension was prepared by mixing 4 parts water with 1 part concentrated suspension described in example 7 above. 140 mL of deionized (DI) water was pumped through the column, followed by 140 mL of the diluted suspension, followed by another 140 mL of DI water. The column pore volume was approximately 35 mL so this was equivalent to pumping 4 PV of DI water, followed by 4 PV of suspension, followed by 4 PV of DI water. At the end of pumping, the column was extruded and sediment samples were collected from the column inlet, middle and effluent ends. FIG. 3 shows the variation in pH in the column effluent over the course of the experiment. The effluent pH increases from roughly 7 to over 9 during breakthrough of the $Mg(OH)_2$ suspension and remains high well after injection of the suspension has ended. FIG. 4 shows the distribution of the alkalinity in over the course of the column experiment. A total of 113 meq of alkalinity or 20% of the total was discharged in the column effluent during the suspension injection and DI post-injection flush. These results demonstrate very effective transport of the composition through a representative sand and the effectiveness of the composition in increasing pH.

Example 12

Field Application at a Chlorinated Solvent Contaminated Site

Soil and groundwater at an industrial site are contaminated with trichloroethylene. The groundwater pH is 5 which less than the optimum level for biotransformation of the contaminants by bacteria. Drums of concentrated vegetable oil and $Mg(OH)_2$ suspension are prepared following Example 9 above and shipped to the site in 55-gallon drums. At the site, the concentrated suspension is diluted with water at a ratio between 1:4 and 1:20 and injected into the aquifer through 1 inch direct push wells spaced between 5 and 20 ft apart. The volume of suspension and water injected through each well is determined based on the amount of alkaline solids required to adjust and maintain the aquifer pH within the desired range. The amount of water injected is determined based on the aquifer porosity, injection zone thickness and well spacing. Following injection, bacterial activity is enhanced by the more desirable pH achieved.

Example 13

Field Application at a Munitions Contaminated Site

Soil at a munitions manufacturing plant is contaminated with Royal Demolition Explosive (RDX or hexahydro-1,3,5- trinitro-1,3,5-triazine) resulting in a plume of groundwater contaminated with RDX that is 20 ft thick vertically, 150 ft wide and is migrating downgradient through the aquifer. A permeable reactive barrier is formed to treat the RDX by installing a row of ten wells spaced 15 ft on center perpendicular to groundwater flow. Forty drums of $Ca(OH)_2$ suspension are prepared following Example 8 above and shipped to the site in 55-gallon drums. At the site, the four drums of concentrated suspension are diluted with water at a ratio of 1 part concentrated suspension to 20 parts water and are injected into each well. As groundwater migrates through the alkaline suspension treated zone, the pH increases to greater than 11 causing the RDX to degrade to harmless end-products.

FURTHER PREFERRED EMBODIMENTS

The following are presently additionally considered preferred embodiments of the invention:

a. A composition for remediating contaminated subsurface material in a treatment zone comprising at least one of unconsolidated material and fractured rock, the composition comprising: a suspension of particles comprising at least three components: a first component consisting of at least one solid alkaline material selected from the group consisting of MgO, $Mg(OH)_2$, $MgCO_3$, CaO, $Ca(OH)_2$, and $CaCO_3$ and any combinations thereof; a second component selected from the group consisting of polyacrylates, polysulfonates, fatty acids or salts of fatty acids with at least ten carbon atoms, vegetable oil, polysorbates, sorbitan esters, lecithin, iron salts, silicates, phosphates, and any combinations thereof; and a third component consisting essentially of water; wherein the suspension has an average particle diameter between 0.1 and 5 microns; wherein the suspension has a viscosity less than 2000 centipoise; and wherein the composition contains an effective amount of the suspension to adjust the pH of the contaminated subsurface material in the treatment zone to a selected level.

b. The composition described in paragraph a. above, wherein the second component preferably is present in an amount between 0.1 and 10% by weight of the first component.

c. The composition described in paragraph a. above, wherein the first component of the suspension consists essentially of 10 to 60% by weight of $Mg(OH)_2$; the second component of the suspension consists essentially of at least one of oleic acid or salts of oleic acid in an amount between 0.1 and 5% by weight of the $Mg(OH)_2$; and the balance of the suspension consists essentially of water.

d. The composition described in paragraph a. above, wherein the first component of the suspension consists essentially of 10 to 60% by weight of $Ca(OH)_2$; the second component of the suspension consists essentially of lignosulfonate in an amount between 0.01 and 1% by weight of the $Ca(OH)_2$; and the balance of the suspension consists essentially of water.

e. The composition described in paragraph a. above wherein the first component of the suspension consists essentially of 1 to 20% by weight of $Mg(OH)_2$; the second component of the suspension consists essentially of 10 to 50% by weight of vegetable oil; and an additional component of the suspension consists essentially of 1 to 10% by weight of nonionic surfactant; and the balance of the suspension consists essentially of water.

f. The composition described in paragraph a. above, wherein the first component of the suspension consists essentially of 20 to 70% by weight of $CaCO_2$; the second component of the suspension consists essentially of 0.2 to 2% by weight of hexametaphosphate; and the balance of the suspension consists essentially of water.

g. A composition for remediating contaminated subsurface material in a treatment zone comprising at least one of unconsolidated material and fractured rock, the composition comprising: a suspension of particles comprising at least three components: a first component consisting of at least one solid alkaline material selected from the group consisting of MgO, $Mg(OH)_2$, $MgCO_3$, CaO, $Ca(OH)_2$, and $CaCO_3$ and any combinations thereof; a second component selected from the group consisting of polyacrylates, polysulfonates, fatty acids or salts of fatty acids with at least ten carbon atoms, vegetable oil, polysorbates, sorbitan esters, lecithin, iron salts, silicates, phosphates, and any combinations thereof; and a third component consisting essentially of water; wherein the suspension has an average particle diameter between 0.1 and 5 microns; wherein the suspension has a viscosity less than 2000 centipoise; wherein the composition contains an effective amount of the suspension to adjust the pH of the contaminated subsurface material in the treatment zone to a selected level and wherein the ratio by weight of the first component of the suspension to the second component of the suspension is adjusted so that the average specific gravity of the particles is less than 1.4.

h. Such other embodiments as are disclosed and described in the claims appended hereto, all of which are incorporated herein by this reference as though fully set forth.

Having thus described the invention, the same will become better understood from the appended claims, which are incorporated herewith by reference into this specification, in which the invention is set forth in a non-limiting manner.

What is claimed is:

1. A method for remediating a subsurface treatment zone in situ, comprising:

preparing an alkaline suspension in an amount effective to achieve remediation when injected into the subsurface treatment zone and at a pH effective to enhance remediation treatment, the suspension comprising at least one of solid MgO particles, solid $Mg(OH)_2$ particles, solid $MgCO_3$ particles, solid CaO particles, solid $Ca(OH)_2$ particles, and solid $CaCO_3$ particles;

the particles having a mean particle size of less than 5 microns;

the suspension further comprising chemicals that alter the surface charge of the particles and reduce attraction between the solid alkaline material and the negatively charged surfaces of subsurface material, and increase the viscosity of the suspension, said chemicals provided in an amount such that the viscosity is increased to a value less than 2000 centipoise, and said chemicals comprising at least one of polyacrylates, polysulfonates, fatty acids or salts of fatty acids with at least ten carbon atoms, vegetable oil, polysorbates, sorbitan esters, lecithin, iron salts, silicates, phosphates and any combinations thereof, and the suspension further comprising water in an amount effective to result in said increased viscosity of less than 2000 centipoise; and introducing the suspension into the treatment zone to enhance remediation.

2. The method according to claim 1, further comprising adding chemicals selected from the group consisting of agar, lignin, alginates, arrowroot, carrageenan, collagen, cornstarch, fecula, gelatin, glycerol, katakuri, pectin, tapioca, Arabic gum, guar gum, locust bean gum, xanthan gum, starch derivatives and cellulose derivatives.

* * * * *